US010785376B2

(12) United States Patent
Nakamura

(10) Patent No.: US 10,785,376 B2
(45) Date of Patent: Sep. 22, 2020

(54) IMAGE PROCESSING APPARATUS FOR SENDING USER INTERFACE DATA

(71) Applicant: KONICA MINOLTA, INC., Chiyoda-ku, Tokyo (JP)

(72) Inventor: Teppei Nakamura, Toyokawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 14/997,338

(22) Filed: Jan. 15, 2016

(65) Prior Publication Data
US 2016/0219161 A1 Jul. 28, 2016

(30) Foreign Application Priority Data
Jan. 22, 2015 (JP) .................. 2015-009997

(51) Int. Cl.
H04N 1/00 (2006.01)

(52) U.S. Cl.
CPC ....... *H04N 1/00204* (2013.01); *H04N 1/0044* (2013.01); *H04N 1/00307* (2013.01); *H04N 1/00411* (2013.01); *H04N 1/00464* (2013.01); *H04N 2201/006* (2013.01); *H04N 2201/0094* (2013.01)

(58) Field of Classification Search
CPC ............. H04N 1/00464; H04N 1/0044; H04N 1/00307; H04N 1/00411
See application file for complete search history.

(56) References Cited

U.S. PATENT DOCUMENTS

| 10,079,945 B2* | 9/2018 | Kono ................ H04N 1/00204 |
| 2013/0095890 A1* | 4/2013 | Kono ................ H04N 1/00424 455/557 |
| 2015/0029541 A1* | 1/2015 | Yun ...................... G06F 3/1232 358/1.15 |
| 2016/0037006 A1* | 2/2016 | Takai ................ H04N 1/00307 358/1.15 |
| 2016/0065764 A1* | 3/2016 | Kang .................... G06F 3/0484 358/1.13 |
| 2017/0048416 A1* | 2/2017 | Cho ...................... G06F 3/1288 |

FOREIGN PATENT DOCUMENTS

JP 2014197361 A 10/2014

* cited by examiner

*Primary Examiner* — Benjamin O Dulaney
(74) *Attorney, Agent, or Firm* — Holtz, Holtz & Volek PC

(57) ABSTRACT

An image processing system comprises: an image processing device capable of displaying a screen; and a terminal device that communicates with the image processing device and operates the image processing device via a remote control. The image processing device sends the screen to the terminal device, thereby enabling the terminal device to display the screen, and determines an application to run on the terminal device based on the screen and sends application running information specified by the determination result or cooperative application information corresponding to the application running information, to the terminal device. The terminal device displays the screen received from the image processing device, and runs the application based on the application running information or the cooperative application information received from the image processing device.

22 Claims, 23 Drawing Sheets

FIG. 5

APPLICATION INFORMATION 25

| APPLICATION NAME (TYPE NAME) | APPLICATION RUNNING INFORMATION |
|---|---|
| IMAGE BROWSE | ImageViewer:// |
| IMAGE EDIT | Paint:/// |
| DOCUMENT EDIT | DocEditor:// |
| HP BROWSE | WebBrowser:// |
| EMAIL | E-mailer:// |
| CHACTER ENTRY | IME:// |
| ⋮ | ⋮ |

25a — APPLICATION NAME (TYPE NAME)
25b — APPLICATION RUNNING INFORMATION

FIG. 7A
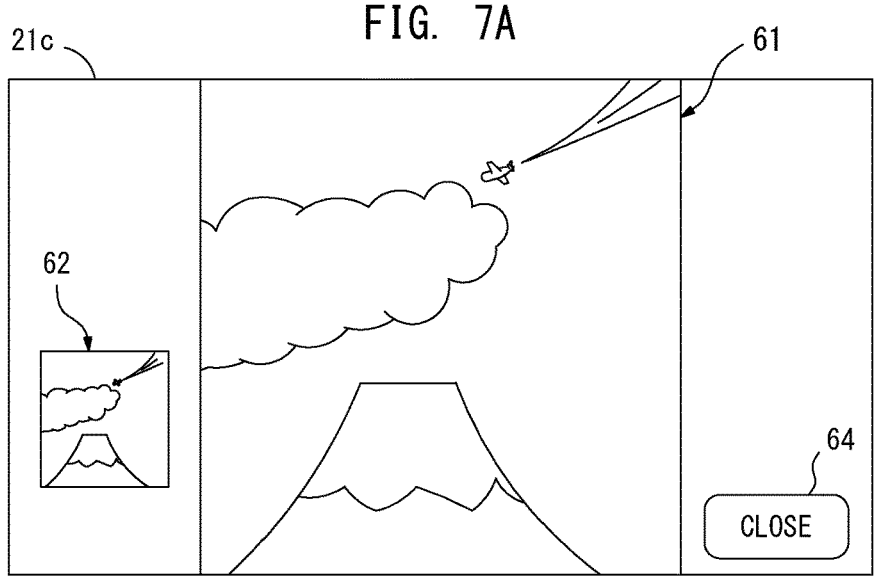
FIG. 7B
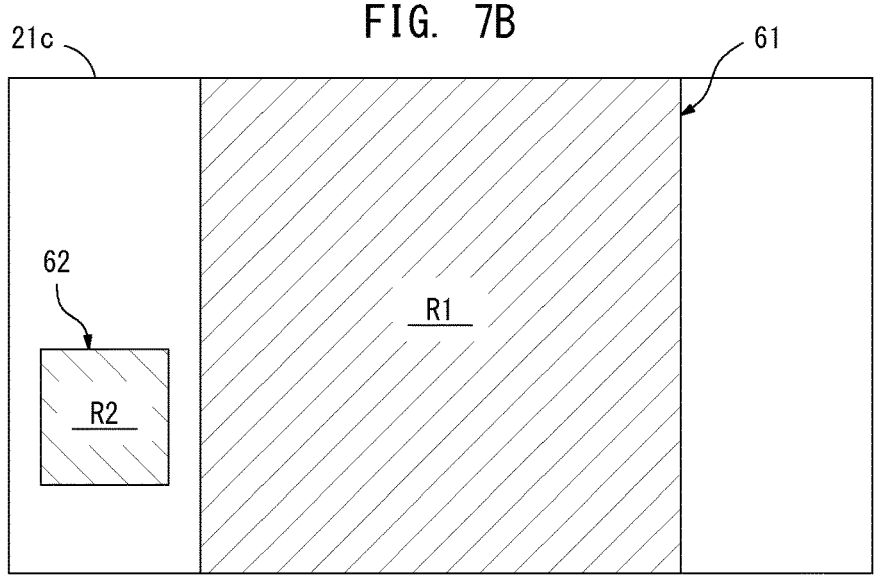
FIG. 7C
COOPERATIVE APPLICATION INFORMATION 28
| | AREA DETERMINING INFORMATION (28a) | APPLICATION RUNNING INFORMATION (25b) |
|---|---|---|
| AREA R1 | (x0, y0) : (x1, y1) | ImageViewer://<br>Paint://<br>E-mailer:// |
| AREA R2 | (x2, y2) : (x3, y3) | ImageViewer://<br>Paint://<br>E-mailer:// |

FIG. 8

AREA IDENTIFYING TABLE 24

| CONTENT TYPE (AREA TYPE) | IMAGE BROWSE | IMAGE EDIT | DOCUMENT EDIT | HP BROWSE | EMAIL | CHARACTER ENTRY |
|---|---|---|---|---|---|---|
| PREVIEW AREA (IMAGE DATA) | ○ | ○ | × | × | ○ | × |
| PREVIEW AREA (DOCUMENT DATA) | × | × | ○ | × | ○ | × |
| PREVIEW AREA (MIXTURE OF IMAGE/DOCUMENT) | ○ | ○ | ○ | × | ○ | × |
| THUMBNAIL AREA (IMAGE DATA) | ○ | × | × | × | ○ | × |
| THUMBNAIL AREA (DOCUMENT DATA) | × | ○ | ○ | × | ○ | × |
| THUMBNAIL AREA (MIXTURE OF IMAGE/DOCUMENT) | ○ | × | × | × | ○ | × |
| TEXT ENTRY AREA (TEXT ENTRY) | × | × | × | × | × | ○ |
| TEXT ENTRY AREA (NUMERICAL ENTRY) | × | × | × | × | × | ○ |
| TEXT ENTRY AREA (MIXTURE OF TEXT/NUMERICAL) | × | × | × | × | × | ○ |

FIG. 9A
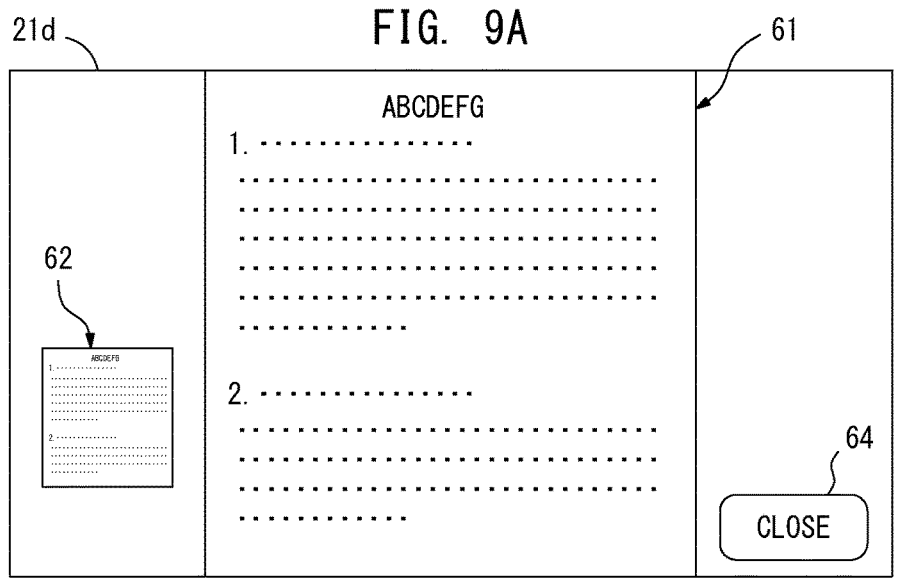
FIG. 9B
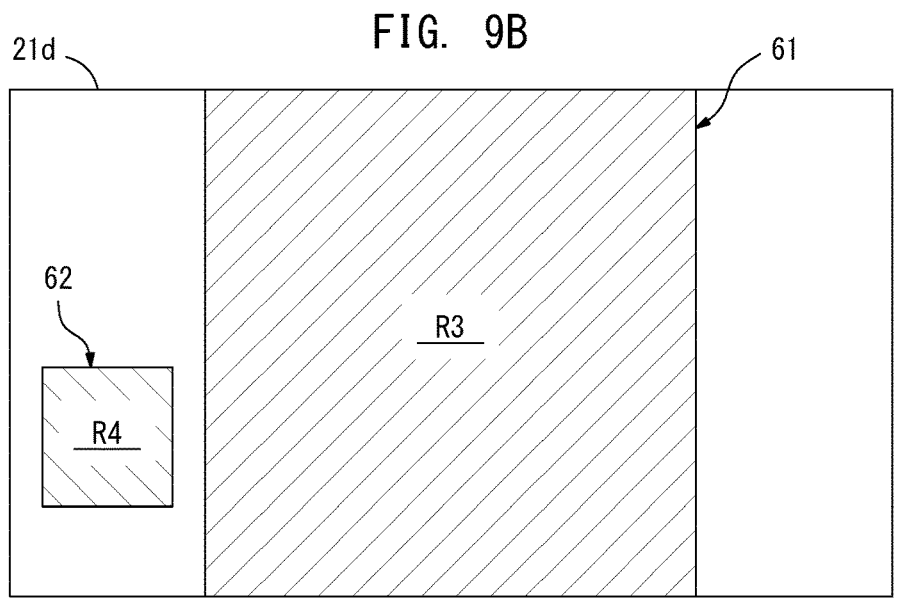
FIG. 9C
COOPERATIVE APPLICATION INFORMATION 28
| | AREA DETERMINING INFORMATION | APPLICATION RUNNING INFORMATION |
|---|---|---|
| AREA R3 | (x0, y0) : (x1, y1) | DocEditor:// E-mailer:// |
| AREA R4 | (x2, y2) : (x3, y3) | DocEditor:// E-mailer:// |

FIG. 10A
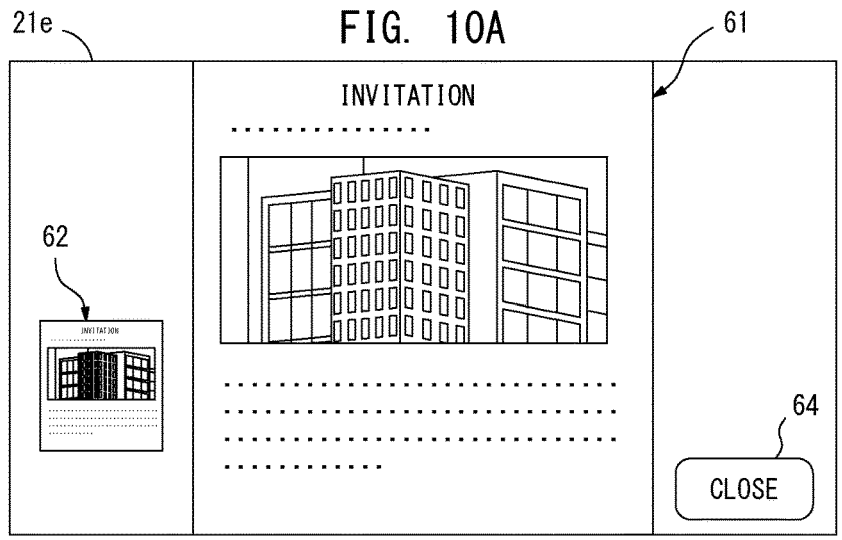
FIG. 10B
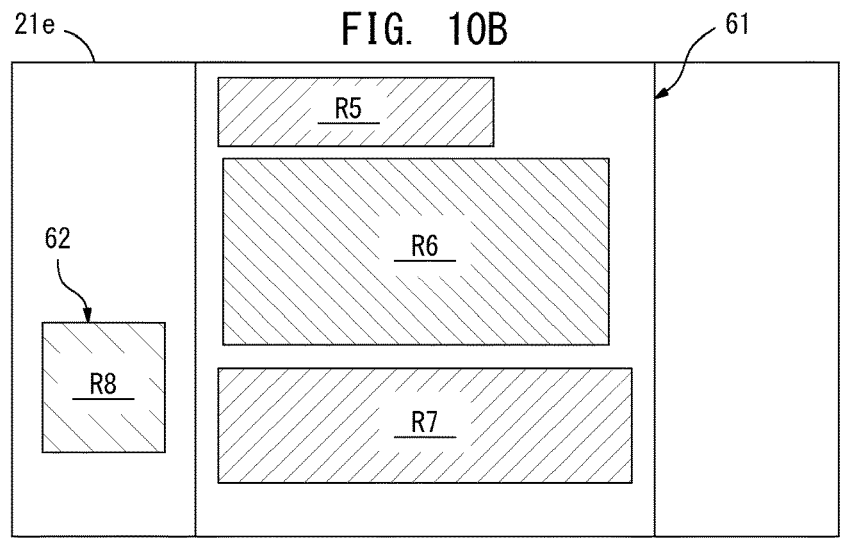
FIG. 10C
COOPERATIVE APPLICATION INFORMATION 28
| | AREA DETERMINING INFORMATION 28a | APPLICATION RUNNING INFORMATION 25b |
|---|---|---|
| AREA R3 | (x0, y0) : (x1, y1) | DocEditor:// <br> E-mailer:// |
| AREA R4 | (x2, y2) : (x3, y3) | DocEditor:// <br> E-mailer:// |
| AREA R7 | (x8, y8) : (x9, y9) | DocEditor:// <br> E-mailer:// |
| AREA R8 | (x2, y2) : (x3, y3) | ImageViewer:// <br> DocEditor:// <br> Paint:// <br> E-mailer:// |

FIG. 11A
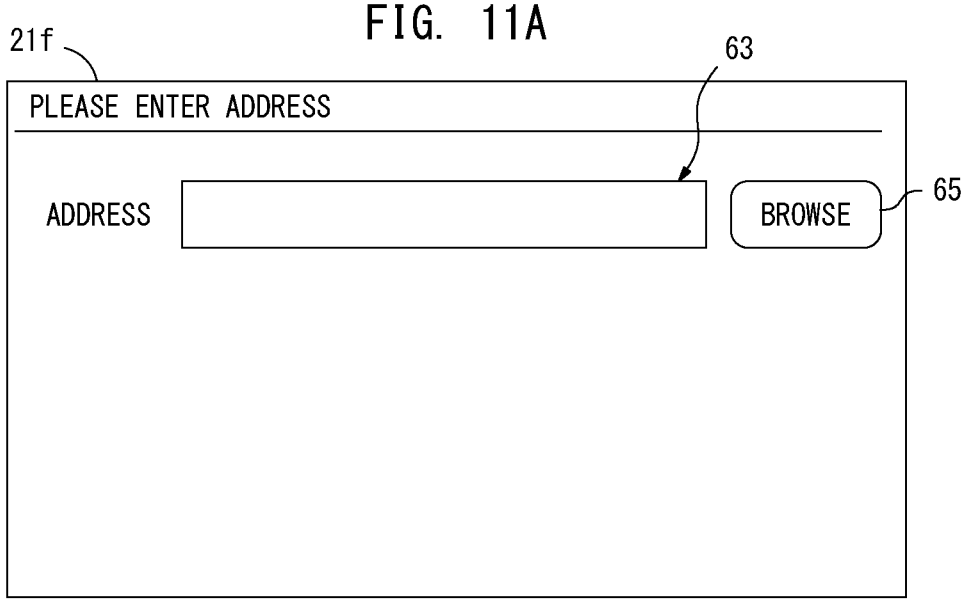
FIG. 11B
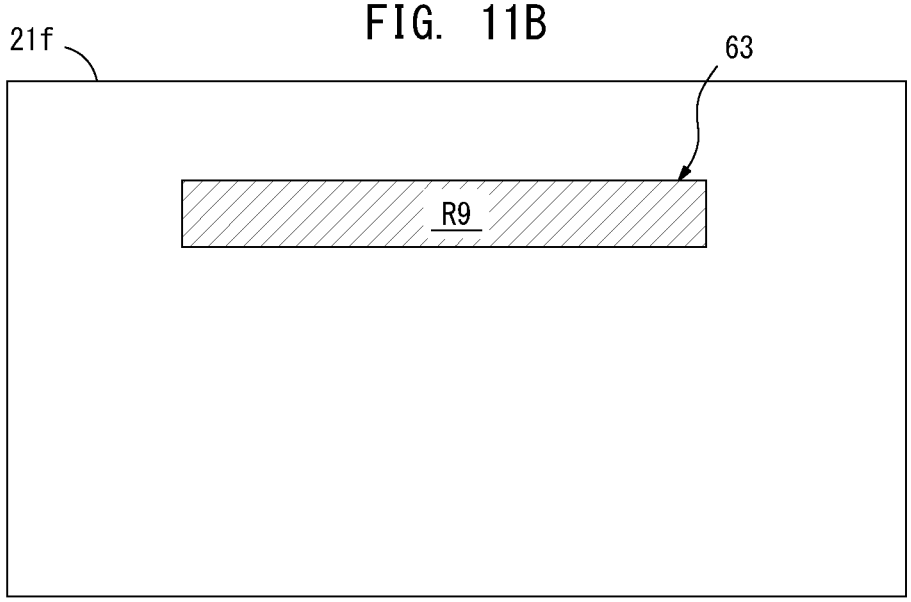
FIG. 11C
COOPERATIVE APPLICATION INFORMATION 28
|  | AREA DETERMINING INFORMATION 28a | APPLICATION RUNNING INFORMATION 25b |
|---|---|---|
| AREA R9 | (x10, y10) : (x11, y11) | IME:// |

IMAGE PROCESSING APPARATUS FOR SENDING USER INTERFACE DATA

This application is based on the application No. 2015-009997 filed in Japan, the contents of which are hereby incorporated by reference.

BACKGROUND OF THE INVENTION

Field of the Invention

The present invention relates to an image processing system, an image processing device, a terminal device and a non-transitory readable recording medium. The present invention more specifically relates to a technique of operating the image processing device from the terminal device via a remote control.

Description of the Background Art

Image processing devices such as MFPs (Multifunction Peripherals) are provided with operational panels as user interfaces for users to operate like configuring a variety of settings about a job. Various types of screens are displayed on the operational panel, and user inputs are received. As terminal devices that may be operated via touch by the users such as smartphones or tablet terminals have recently become popular, the image processing device sends the screens to be displayed on the operational panel to the terminal device and enables the terminal device to display the received screens, thereby receiving remote operations from the terminal device. This known technique is introduced for example in Japanese Patent Application Laid-Open No. JP 2014-197361 A.

According to the known remote operation technique, after an application for the remote control is run on the terminal device, the cooperative operations between the terminal device and the image processing device are started, and the screen as image data such as a bitmap image is sent to the terminal device from the image processing device. In response to receiving the screen from the image processing device, the terminal device displays the received screen. The screen, however, is the image data such as the bitmap image. The terminal device, therefore, is not allowed to find that operation keys that may be operated by the users are placed at which part of the screen. Thus, the terminal device is required to send coordinate information indicating the operated position to the image processing device every time detecting the user operation to the screen, and the image processing device performs the process corresponding to the user operation.

SUMMARY OF THE INVENTION

If all the process corresponding to the user operations made at the terminal device is performed at the image processing device, the process load on the image processing device increases, resulting in reduction of a job execution efficiency.

A variety of applications including image edit applications and document edit applications are installed on current terminal devices. When the user specifies image edit or document edit, it is more efficient to perform such process at the terminal device by running the application rather than performing at the image processing device.

The present invention is intended to solve the above problems. Thus, the present invention is intended to provide an image processing system, an image processing device, a terminal device and a non-transitory computer readable recording medium capable of reducing process load on the image processing device by enabling the terminal device to run an application and perform a process corresponding to a user operation.

First, the present invention is directed to an image processing system comprising: an image processing device capable of displaying a screen; and a terminal device that communicates with the image processing device and operates the image processing device via a remote control.

According to one aspect of this invention, the image processing device sends the screen to the terminal device, thereby enabling the terminal device to display the screen, and determines an application to run on the terminal device based on the screen and sends application running information specified by the determination result or cooperative application information corresponding to the application running information, to the terminal device, and the terminal device displays the screen received from the image processing device, and runs the application based on the application running information or the cooperative application information received from the image processing device.

Second, the present invention is directed to an image processing device capable of sending a screen to a terminal device and enabling the terminal device to display the screen.

According to one aspect of this invention, the image processing device comprises a hardware processor configured to: send the screen to the terminal device; determine an application to run on the terminal device based on the screen; and send application running information specified by the determination result or cooperative application information corresponding to the application running information, to the terminal device.

Third, the present invention is directed to a terminal device capable of displaying a screen received from an image processing device and operating the image processing device.

According to one aspect of this invention, the terminal device comprises a hardware processor configured to: display the screen; receive application running information for an application to run on the terminal device or cooperative application information corresponding to the application running information from the image processing device; and run the application based on the application running information or the cooperative application information.

Fourth, the present invention is directed to a non-transitory computer readable recording medium storing a program to be executed by an image processing device capable of sending a screen to a terminal device and enabling the terminal device to display the screen.

According to one aspect of this invention, execution of the program by the image processing device causing the communication relay device to execute the steps of: sending the screen to the terminal device; determining an application to run on the terminal device based on the screen; and sending application running information specified by the determination result or cooperative application information corresponding to the application running information, to the terminal device.

Fifth, the present invention is directed to a non-transitory computer readable recording medium storing a program to be executed by a terminal device capable of displaying a screen received from an image processing device and operating the image processing device.

According to one aspect of this invention, execution of the program by the terminal device causing the communication relay device to execute the steps of: displaying the screen; receiving application running information for an application to run on the terminal device or cooperative application information corresponding to the application running information from the image processing device; and running the application based on the application running information or the cooperative application information.

BRIEF DESCRIPTION OF THE DRAWINGS

FIG. 5 shows an example of application information;

FIGS. 7A, 7B and 7C show a process concept when a preview screen is obtained by a screen obtaining part;

FIG. 8 shows an example of an area identifying table;

FIGS. 9A, 9B and 9C show a process concept when the preview screen is obtained by the screen obtaining part;

FIGS. 10A, 10B and 10C show a process concept when the preview screen which has the mix of an image and a document is obtained by the screen obtaining part;

FIGS. 11A, 11B and 11C show a process concept when an address setting screen is obtained by the screen obtaining part;

DESCRIPTION OF THE PRESENT PREFERRED EMBODIMENTS

Figure 1:
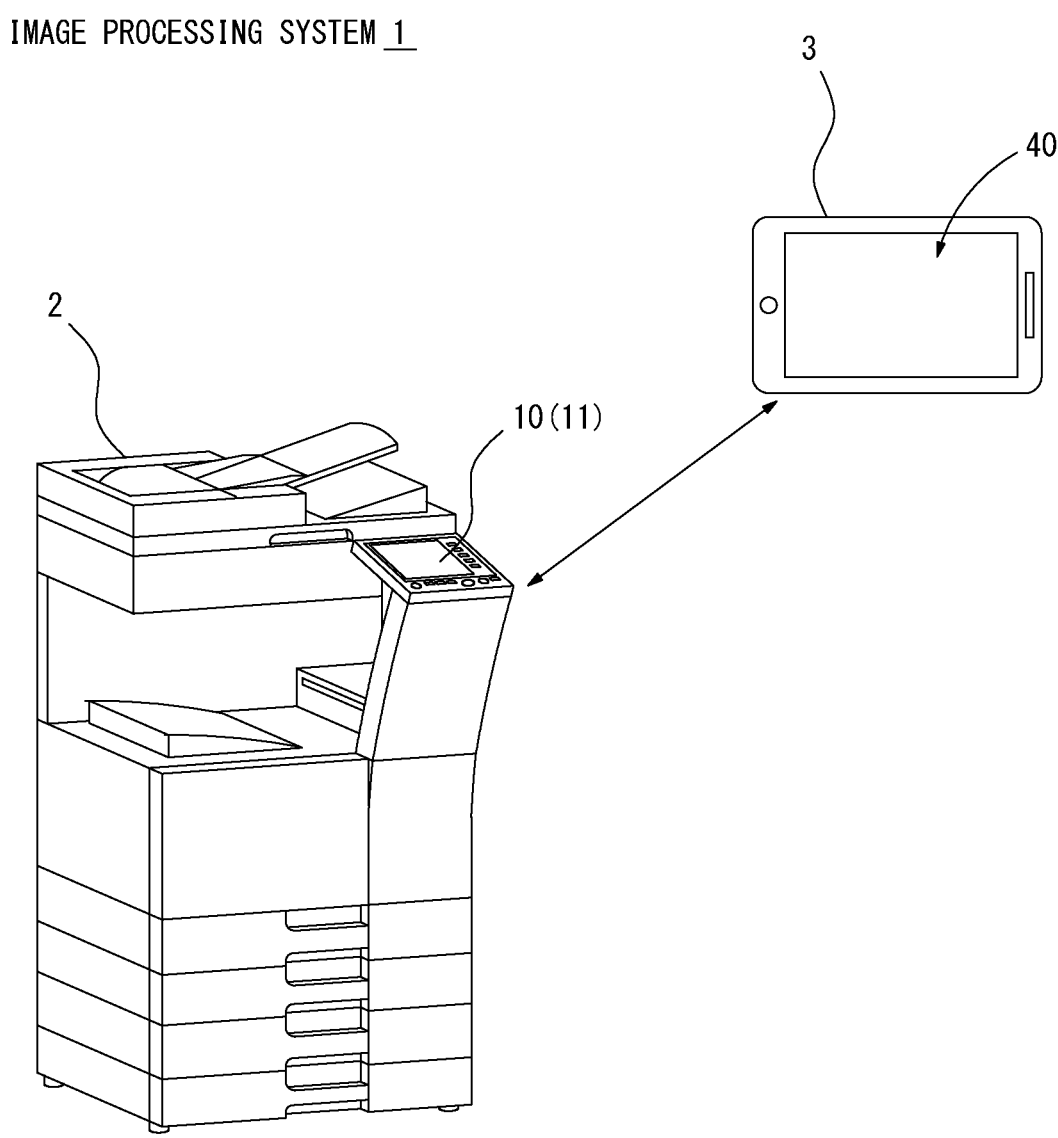
FIG. 1 shows an exemplary configuration of an image processing system.

Preferred embodiments of the present invention are described in detail below with reference to figures. In the description given below, those elements which are shared in common among figures are represented by the same reference numerals, and these elements are not discussed repeatedly for the same description.

First Preferred Embodiment

FIG. 1 shows an exemplary configuration of an image processing system 1 of the first preferred embodiment of the present invention. The image processing system 1 comprises an image processing device 2 constructed by a device such as one of MFPs and a terminal device 3 constructed by a device such as a personal computer (PC), a tablet terminal or a smartphone. The image processing device 2 and the terminal device 3 are capable of sending and receiving data to and from each other over a network such as a LAN (Local Area Network) or a radio communication mean such as a Bluetooth (registered trademark) or a NFC (Near Field Communication).

The image processing device 2 includes multiple functions such as a copy function, a scan function, a print function, a fax function and a box function, for example. The image processing device 2 activates the function selected by the user, thereby executing a job. The box function is a storage function to store data such as image data and/or document data. The image processing device 2 is provided with an operational panel 10, which is a user interface for the user to select the function, configure settings about a job and/or give an instruction to execute the job. The operational panel 10 includes a display unit 11 formed from a device such as a color liquid crystal display, for example. The image processing device 2 receives a user operation as displaying a variety of screens on which the user is allowed to operate on the display unit 11 of the operational panel 10. The image processing device 2 sends screen data of the screen stored in advance to display on the operational panel 10 to the terminal device 3 over the network, thereby enabling the terminal device 3 to display the screen. For sending the image data of the screen to the terminal device 3, the image processing device 2 sends the image data of the screen as the image data such as JPEG data or bitmap data.

The terminal device 3 includes a display unit 40 formed from a device such as a color liquid crystal display, for example, to display a variety of information. As described later, a remote control program 46 (see FIG. 3) for operating the image processing device 2 via a remote control by communicating with the image processing device 2 is installed in advance on the terminal device 3. The terminal device 3 executes the remote control program 46, thereby communicating with the image processing device 2. After receiving the screen data from the image processing device 2, the terminal device 3 displays the screen based on the received screen data on the display unit 40. To be more specific, the terminal device 3 is capable of displaying the similar screen as the operational panel 10 of the image processing device 2 on the display unit 40. As a result, the user is allowed to operate the terminal device 3 with viewing the screen displayed on the terminal device 3, and operate the image processing device 2 via the remote control.

A variety of application programs 47 (see FIG. 3) except for the remote control program 46 are installed on the terminal device 3. The variety of application programs 47 include, for example, a program for image edit and/or a program for document edit. The application programs 47 are executed as the remote control program 46 has already been executed on the terminal device 3, so that an edit process of data such as the image data and/or the document data stored in the image processing device 2 may be allowed at the terminal device 3. It is assumed that the user gives an instruction to edit the image or the document on the screen when the screen for the remote control is displayed at the terminal device 3. In this case, the image processing system 1 of the first preferred embodiment is configured to enable the terminal device 3 to automatically execute the application program 47 corresponding to the given instruction and run the application.

The image data that the terminal device 3 receives from the image processing device 2 is, however, the image data such as the JPEG data or the bitmap data. Even if the terminal device 3 detects the user operation as displaying the screen based on the image data on the display unit 40, it is not allowed to identify what application should be run only with the image data. The image processing device 2 and the terminal device 3 of the first preferred embodiment, therefore, work in concert with each other so that the application may be run automatically on the terminal device 3. To be more specific, the image processing device 2 on the image processing system 1 of the first preferred embodiment is configured to send the screen to the terminal device 3 and enable the terminal device 3 to display the screen. The image processing device 2 is also configured to determine the application that should be run on the terminal device 3 based on the screen and send application running information to the terminal device 3 based on the determination result. The terminal device 3 is configured to display the screen received from the image processing device 2. The terminal device 3 is also configured to execute one of the application programs 47 based on the application running information received from the image processing device 2 and run the application for image edit or document edit. The image processing system 1 is described in detail next.

Figure 2:
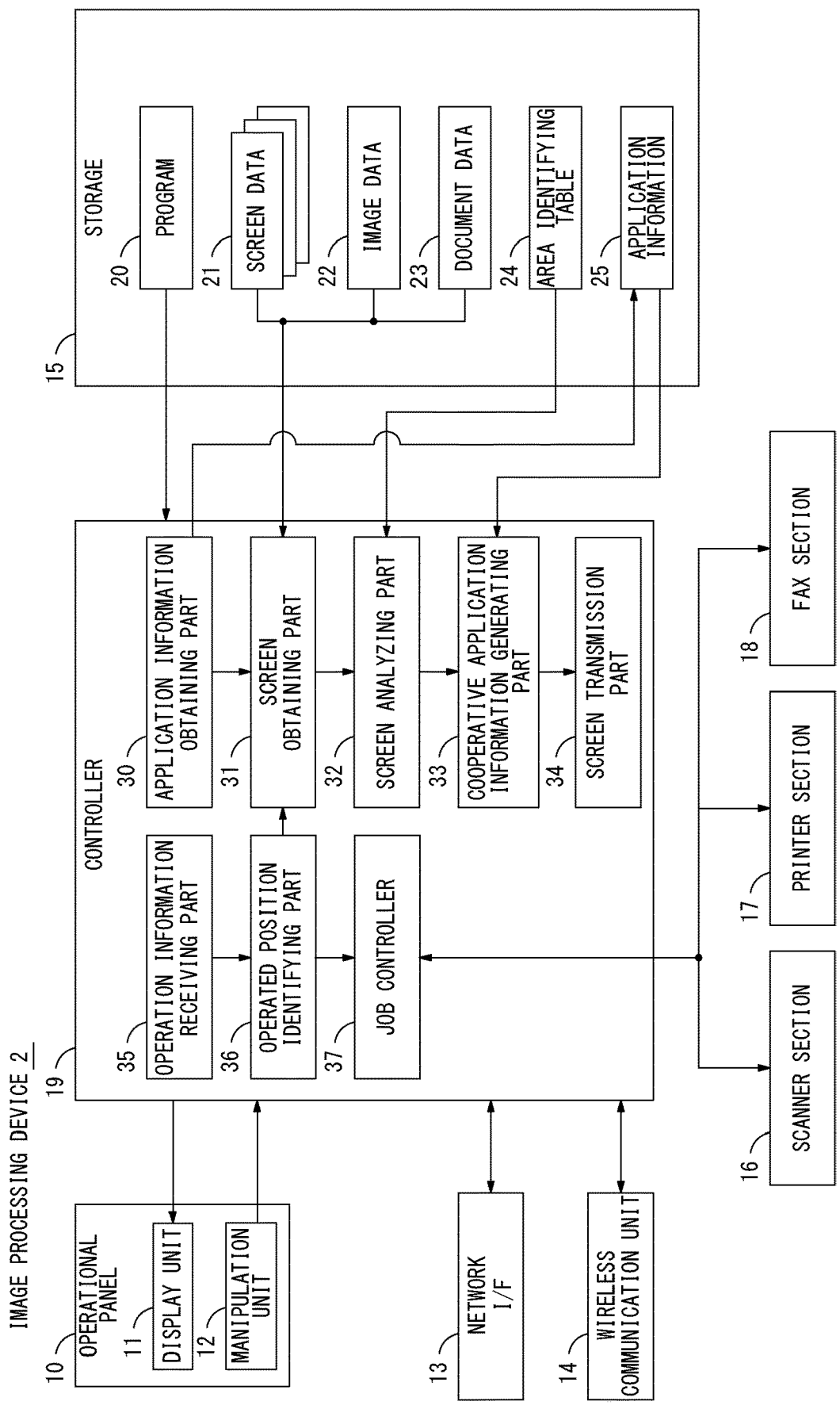
FIG. 2 is a block diagram showing an example of a hardware structure and that of a functional structure of an image processing device.

FIG. 2 is a block diagram showing an example of a hardware structure and that of a functional structure of the image processing device 2. The image processing device 2 includes the operational panel 10, a network interface 13, a wireless communication unit 14, a storage 15, a scanner section 16, a printer section 17, a fax section 18 and a controller 19.

The operational panel 10 includes a manipulation unit 12 besides the aforementioned display unit 11. The manipulation unit 12 is formed with parts such as touch panel keys arranged on the screen of the display area of the display unit 11 and push-button keys arranged around the display area of the display unit 11, for example. The manipulation unit 2 receives inputs by the user.

The network interface 13 connects the image processing device 2 to a network such as LAN. The wireless communication unit 14 establishes wireless communication such as Bluetooth (registered trademark) or a NFC (Near Field Communication). The wireless communication unit 14 is, for example, capable of establishing one-to-one communication with the terminal device 3.

The storage 15 is formed from a nonvolatile storage device such as a hard disk drive (HDD) or a solid state drive (SSD), for instance. Information including the variety of programs and data is stored in the storage 15. A part of the storage 15 is used by the box function. Data including a program 20 executed at the image processing device 2, screen data 21 relating to the screen to be displayed on the display unit 11 of the operational panel 10 and/or the display unit 40 of the terminal device 3, image data 22 managed by the box function, document data 23 also managed by the box function, an area identifying table 24 which is referred at analysis of the screen and application information 25 obtained at the beginning of the communication with the terminal device 3, for instance, is stored in the storage 15 as illustrated in FIG. 2.

The scanner section 16 is brought into operation when the function such as the copy function, the scan function or the fax transmission function is selected by the user. The scanner section 16 optically reads an image of a document placed by the user and generates image data. The printer section 17 becomes operative when the copy function or the print function is selected by the user, or the fax section 18 receives fax data over a public phone line. The printer section 17 produces a printed output by forming images on a sheet material such as a printing sheet based on the received image data. The fax section 18 transmits and receives the fax data.

The controller 19 includes a CPU and a memory that are not shown in FIG. 2. The CPU reads and executes the program 20, thereby controlling operations of each aforementioned part. The CPU executes the program 20 so that the controller 19 of the first preferred embodiment serves as an application information obtaining part 30, a screen obtaining part 31, a screen analyzing part 32, a cooperative application information generating part 33, a screen transmission part 34, an operation information receiving part 35, an operated position identifying part 36 and a job controller 37. Each of the processing parts becomes operative when the image processing device 2 starts the communication with the terminal device 3.

The application information obtaining part 30 obtains the application information 25 relating to the application that may be run on the terminal device 3. The application information obtaining part 30, for example, obtains the application information 25 from the terminal device 3 at the beginning of the communication with the terminal device 3. Information relating to the multiple applications that may be run on the terminal device 3 and the application running information to run each application are contained in the application information 25. After obtaining the application information 25 from the terminal device 3, the application information obtaining part 30 temporarily stores the obtained application information 25 in the storage 15.

The screen obtaining part 31 reads the screen data 21 in the storage 15, thereby obtaining the screen to send to the terminal device 3. There are various types of screens to be sent to the terminal device 3 from the image processing device 2. The screen data 21 corresponding to the various types of screens are stored in the storage 15, respectively. The screen obtaining part 31 selects and reads the screen data 21 corresponding to the screen that should be displayed at the terminal device 3 from among the screen data 21 in the storage 15. The screen obtaining part 31 may read the image data 22 and/or the document data 23 in the storage 15 with the screen data 21 and combine with the screen data 21, thereby creating a screen including a preview image based on the image data 22 and/or the document data 23. The screen obtaining part 31 outputs the screen to send to the terminal device 3 to the screen analyzing part 32.

The screen analyzing part 32 analyzes the screen obtained or created by the screen obtaining part 31. The screen analyzing part 32 refers the area identifying table 24 stored in advance in the storage 15, and determines the application to run on the terminal device 3 for each area of the screen. To be more specific, the screen analyzing part 32 analyzes each content in the screen, and determines the type of the application to run on the terminal device 3 depending on the type of each content. The contents included in the screen may be multiple kinds of contents such as operation keys for the user to configure the settings about the job, preview images and/or entry boxes to enter characters. The screen analyzing part 32 determines the type of the content, and determines the type of the application depending on the determined content type. The screen analyzing part 32 associates the area including the content and the application with each other. The content may be one of the operation keys to configure the setting about the job or switch the screen. In this case, there is no application to run on the terminal device 3. The screen analyzing part 32, therefore, does not associate the content with the application. The screen analyzing part 32 may associate more than one application with one area.

The cooperative application information generating part 33 generates the cooperative application information in which the application running information to run the application on the terminal device 3 is associated with each area of the screen based on the determination result by the screen analyzing part 32. To be more specific, the cooperative application information generating part 33 reads the application running information corresponding to the application type determined by the screen analyzing part 32 from the application information 25 in the storage 15, and associates the read application running information with the area including the content of the screen, thereby generating the cooperative application information. It is assumed that more than one application is associated with one of the areas by the screen analyzing part 32. In this case, the cooperative application information generating part 33 generates the cooperative application information in which multiple pieces of application running information is associated with one of the areas by the screen analyzing part 32.

The screen transmission part 34 sends the screen to the terminal device 3 via the network interface 13 or the wireless communication unit 14. For sending the screen data 21 relating to the screen to the terminal device 3, the screen transmission part 34 converts the screen data 21 into the JPEG data or the bitmap data, thereby sending it. For sending the screen to the terminal device 3, the screen transmission part 34 also sends the cooperative application information generated by the cooperative application information generating part 33 to the terminal device 3 with the screen.

The operation information receiving part 35 receives operation information from the terminal device 3. In response to receiving the operation information, the operation information receiving part 35 outputs the received operation information to the operated position identifying part 36.

The operated position identifying part 36 identifies an operated position where the user of the terminal device 3 touched, for instance, based on the operation information. To be more specific, the operation information contains coordinate information of the position that the user of the terminal device 3 touched, for instance. The operated position identifying part 36 identifies the operated position in the screen based on the coordinate information. The operated position identifying part 36 identifies the content such as the operation key shown at the operated position, and notifies the job controller 37 or the screen obtaining part 31 that the operation key is operated.

The job controller 37 configures the setting about the job based on the user setting operation when the content such as the operation key to configure the setting about the job is operated by the user of the terminal device 3. Also, when the operation key to give the instruction to start job execution is operated by the user of the terminal device 3, the job controller 37 enables the scanner section 16, the printer section 17 or the fax section 18 to become operative and controls the execution of the job specified by the user.

If the screen needs to be updated due to the operation of the user of the terminal device 3, the screen obtaining part 31 reads again the screen data 21 in the storage 15 and obtains the screen, the job setting by the job controller 37 is applied. After the determination of the application by the screen analyzing part 32 and the generation of the cooperative application information by the cooperative application information generating part 33, the updated screen is sent to the terminal device 3 by the screen transmission part 34.

Figure 3:
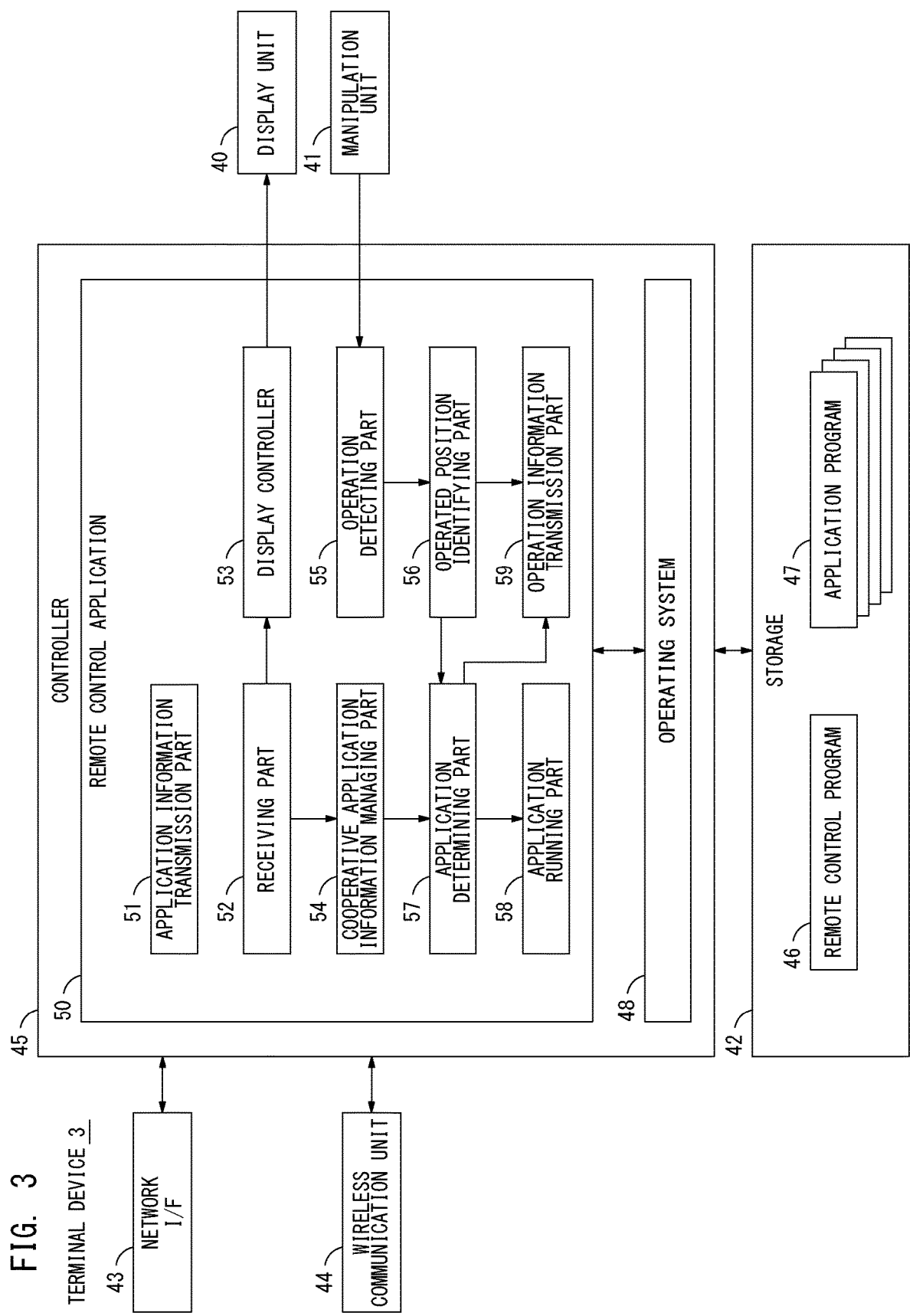
FIG. 3 is a block diagram showing an example of a hardware structure and that of a functional structure of a terminal device.

FIG. 3 is a block diagram showing an example of a hardware structure and that of a functional structure of the terminal device 3. The terminal device 3 includes the display unit 40, a manipulation unit 41, a storage 42, a network interface 43, a wireless communication unit 44 and a controller 45. The manipulation unit 41 formed from a touch panel arranged on a display screen of the display unit 40, for instance, receives user inputs. The storage 42 formed from a nonvolatile storage device such as a hard disk drive (HDD) or a solid state drive (SSD), for instance, stores therein the remote control program 46 and the various types of application programs 47. The network interface 43 is to connect the terminal device 3 to the network such as LAN. The wireless communication unit 44 establishes wireless communication such as Bluetooth (registered trademark) or the NFC (Near Field Communication). The wireless communication unit 44 is, for example, capable of establishing one-to-one communication with the image processing device 2, for instance.

The controller 45 includes a CPU and a memory that are not shown in FIG. 3. The controller 45 runs an operating system 48 when the terminal device 3 is powered on. After the user gives the instruction to execute the remote control program 46 as the operating system 48 is running, the CPU reads and executes the remote control program 46. The controller 45 then runs a remote control application 50 to operate the image processing device 2 via the remote control on the operating system 48. The remote control application 50 displays the screen received from the image processing device 2 on the display unit 40. Also, in response to detecting the user operation on the screen via the manipulation unit 41, the remote control application 50 sends the operation information based on the detected operation to the image processing device 2 and/or runs the application program 47. The remote control application 50 includes an application information transmission part 51, a receiving part 52, a display controller 53, a cooperative application information managing part 54, an operation detecting part 55, an operated position identifying part 56, an application determining part 57, an application running part 58 and an operation information transmission part 59.

The application information transmission part 51 becomes operative when the remote control application 50 is started running. The application information transmission part 51 establishes the communication with the image processing device 2 via the network interface 43 or the wireless communication unit 44. Also, the application information transmission part 51 obtains the application information relating to the application that may be run on the terminal device 3 from the operating system 48, and sends the obtained application information to the image processing device 2.

The receiving part 52 receives the screen and the cooperative application information from the image processing device 2. After receiving the screen data 21 relating to the screen from the image processing device 2, the receiving part 52 outputs the image data 21 to the display controller 53. The display controller 53 displays the screen on the display unit 40 based on the screen data 21 received by the receiving part 52. Moreover, in response to receiving the cooperative application information from the image processing device 2 together with the screen, the receiving part 52 outputs the cooperative application information to the cooperative application information managing part 54. The cooperative application information managing part 54 temporarily stores the cooperative application information relating to the screen received from the image processing device 2 in the memory, for instance, to manage.

The operation detecting part 55 detects the user operation via the manipulation unit 41 as the screen is displayed on the display unit 40. After the user operation is detected by the operation detecting part 55, the operated position identifying part 56 identifies the operated position where the user operated on the screen. The operated position is identified as the coordinate position on the screen of the display unit 40. The operated position identifying part 56 outputs the information relating to the identified operated position to the application determining part 57 and the operation information transmission part 59.

The application determining part 57 obtains the cooperative application information from the cooperative application information managing part 54 when the operated position is identified by the operated position identifying part 56, and determines whether or not the application running information is associated with the area including the identified operated position. The identified operated position may be included in one of the areas with which the application running information is associated as a result of determination. In this case, the application determining part 57 brings the application running part 58 into operation. The identified operated position may not be included in any area with which the application running information is associated. In this case, the application determining part 57 brings the operation information transmission part 59 into operation.

The application running part 58 reads the application running information associated with the area including the operated position touched by the user from the cooperative application information, and runs the application designated with the application running information via the operating system 48. The application running information indicates the application or the type of the application that should be run on the terminal device 3. If one of the applications is designated with the application running information, the application running part 58 runs the designated application via the operating system 48. Multiple applications may be designated with the application running information. In this case, the application running part 58 obtains a list of the multiple applications via the operating system 48, and selects one of the applications from the list to run. The type of the application may be designated with the application running information. In this case, the application running part 58 obtains the list of the applications belong to the designated type via the operating system 48, and selects one of the applications from the list to run. More specifically, as the application running part 58 becomes operative at the terminal device 3, the terminal device 3 is allowed to execute one of the multiple application programs 47 stored in the storage 42 and run the application, thereby performing the process corresponding to the user operation with the running application.

If no application running information is associated with the area including the operated position touched by the user, the operation information transmission part 59 generates the operation information containing the operated position (coordinate position) and sends the generated operation information to the image processing device 2. As a result, the process corresponding to the user operation is performed at the image processing device 2. When the new screen is received from the image processing device 2, the aforementioned display controller 53 updates the screen displayed on the display unit 40.

Figure 4:
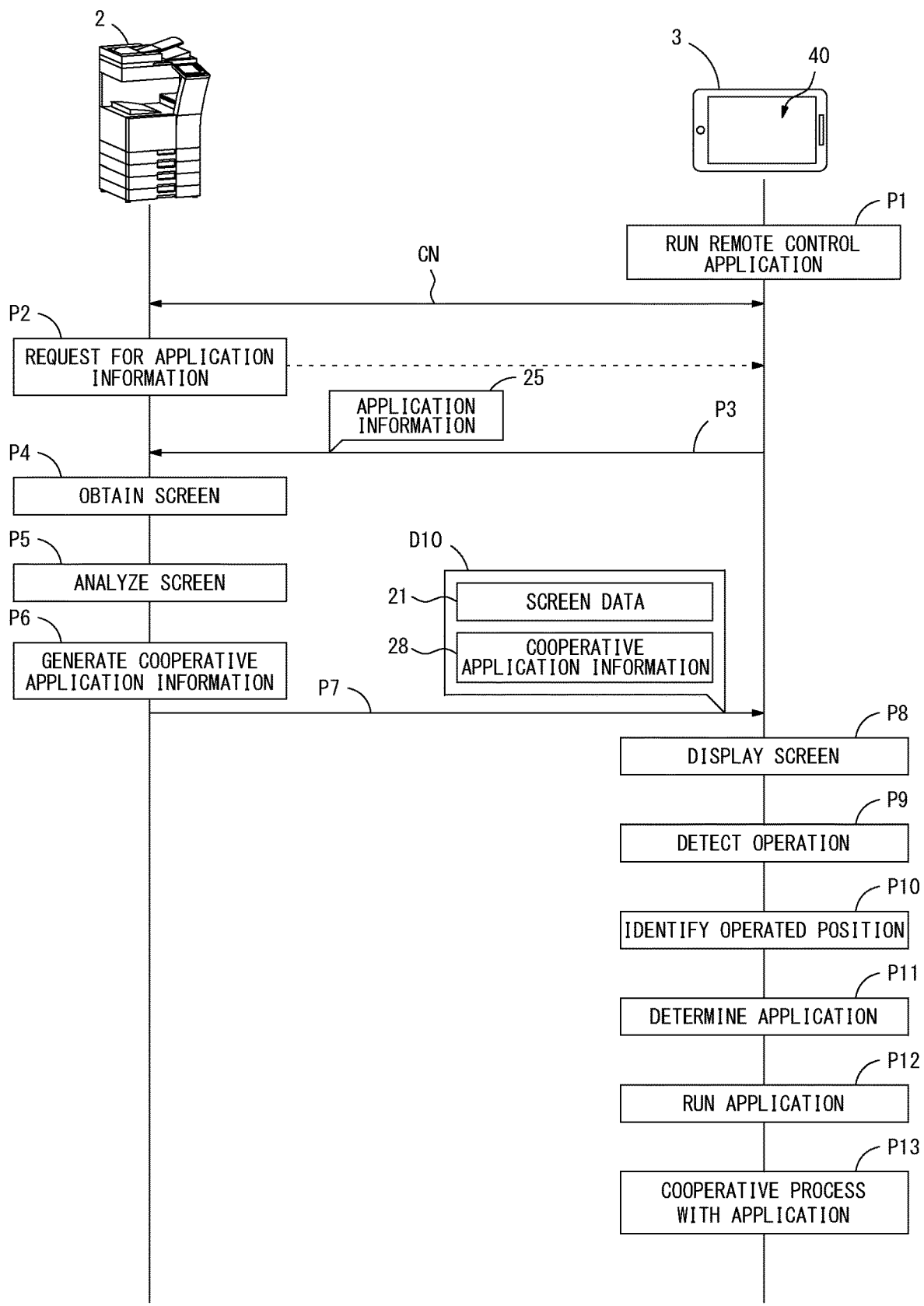
FIG. 4 shows an example of an operation process performed at the image processing device and the terminal device.

An operation process performed on the image processing system 1 comprising the aforementioned structures is described next. FIG. 4 shows an example of the operation process performed at the image processing device 2 and the terminal device 3. The terminal device 3 executes the remote control program 46 in response to the user instruction at first, and runs the remote control application 50 (process P1). After running the remote control application 50, the terminal device 3 establishes a communication CN with the image processing device 2. When the communication CN with the terminal device 3 is established, the image processing device 2 brings the application information obtaining part 30 into operation to send a request for the application information to the terminal device 3 (process P2). In response to receiving the request for the application information from the image processing device 2, the terminal device 3 brings the application information transmission part 51 of the remote control application 50 into operation. The application information transmission part 51 obtains the application information 25 relating to the application program 47 installed on the terminal device 3 via the operating system 48, and sends the obtained application information 25 to the image processing device 2 (process P3). The application information 25 sent to the image processing device 2 from the terminal device 3 depends on the type of the operating system 48 of the terminal device 3.

FIG. 5 shows an example of the application information 25. The application information 25 includes an application name 25a and corresponding application running information 25b associated with each other. The application name 25a is information that shows an application name or a type name of the application that may be run on the terminal device 3. The application running information 25b is information in which commands to enable the operating system 48 to read and/or run the application specified by the application name 25a are described. The command to enable the operating system 48 to read all of the applications that are capable of browsing images among from the multiple applications installed on the terminal device 3 is described in the application running information 25b corresponding to the application name 25a of "image browse," for example. This command depends on the type of the operating system 48 of the terminal device 3. For iOS, for instance, the command is described in a code form which is called a URL scheme. For Android (registered trademark), the command is described in a code form which is called an intent running order. The application running information 25b corresponding to every application or the type of the application that may be run on the terminal device 3 is recorded in the application information 25. Hence, the image processing device 2 obtains the application information 25 in advance from the terminal device 3, thereby obtaining the command necessary for running the application on the terminal device 3.

After obtaining the application information 25, the image processing device 2 brings the screen obtaining part 31 into operation. The screen obtaining part 31 reads the screen data 21 in the storage 15, and obtains the screen to display at the terminal device 3 (process P4). The screen analyzing part 32 of the image processing device 2 becomes operative next. The screen analyzing part 32 analyzes the contents included in the screen, and determines the application to run on the terminal device 3 for each area that includes the content, respectively (process P5). The cooperative application information generating part 33 then generates the cooperative application information 28 based on the analysis result in process P5 (process P6). One or multiple pieces of application running information 25b included in the application information 25 is associated with each area of the screen as described later in the cooperative application information 28. After the cooperative application information 28 for the screen obtained by the screen obtaining part 31 is generated, the image processing device 2 brings the screen transmission part 34 into operation. The screen transmission part 34 sends data D10 to the terminal device 3 (process P7). The data D10 is formed from the screen data 21 to display at the terminal device 3 and the attached cooperative application information 28.

After receiving the data D10 from the image processing device 2, the terminal device 3 brings the display controller 53 into operation. The display controller 53 displays the screen on the display unit 40 based on the screen data 21 in the data D10 (process P8). The cooperative application information 28 included in the data D10 received from the image processing device 2 is temporarily stored in the storage such as the memory and managed by the cooperative application information managing part 54. The operation detecting part 55 then detects the user operation (process P9). In this case, the terminal device 3 brings the operated position identifying part 56 into operation, and identifies the operation position where the user operated on the screen (process P10). The terminal device 3 brings the application determining part 57 into operation, and determines if the application running information 25b is associated with the area including the operated position touched by the user in the cooperative application information 28. The application running information 25b may be associated with the area including the operated position touched by the user. In this case, the terminal device 3 brings the application running part 58 into operation. The application running part 58 obtains the application running information 25b associated with the area including the operated position touched by the user in the cooperative application information 28, and outputs the obtained application running information 25b to the operating system 48, then runs the application (process P12). To be more specific, in response to obtaining the application running information 25b that may be interpreted by itself, the operating system 48 reads and executes the application program 47 based on the application running information 25b, thereby running the application on the controller 45. If the application running information 25b designates more than one application to run, the operating system 48 returns the list of more than one application to the application running part 58. By receiving an order to run one of more than one application thereby selected from the application running part 58, the operating system 48 runs the application specified by the application running part 58. The remote control application 50 starts the cooperative process with another application run by the operating system 48 (process P13).

According to the first preferred embodiment, the image processing device 2 and the terminal device 3 work in concert with each other as described above. As a result, after the user operation on the screen displayed at the terminal device 3 is detected, the terminal device 3 automatically runs the application which works in concert with the remote control application 50, thereby allowing the process corresponding to the user operation to be performed at the terminal device 3.

Figure 6A:
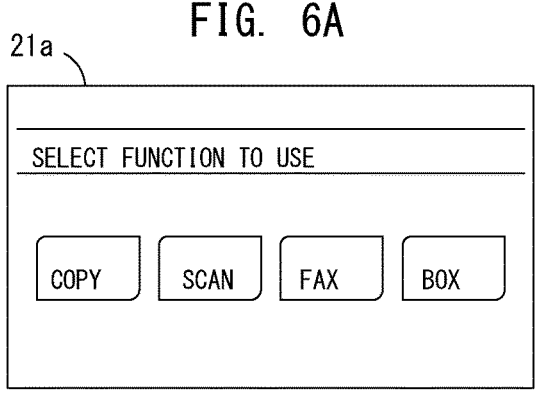
FIGS. 6A to 6F show some examples of screens sent to the terminal device from the image processing device.

FIGS. 6A to 6F show some examples of the screens sent to the terminal device 3 from the image processing device 2. FIG. 6A shows an initial screen 21a that is sent at first from the image processing device 2 at the beginning of the communication with the terminal device 3. The initial screen 21a includes operation keys for the user to select the function from among the copy function, the scan function, the fax function and the box function as the contents. Hence, the user of the terminal device 3 is allowed to select the function of the image processing device 2 as the initial screen 21a is displayed.

Figure 6B:
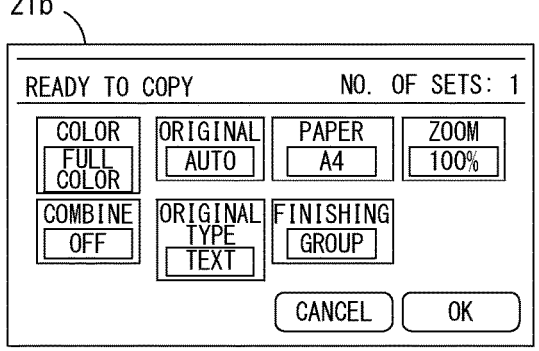

FIG. 6B shows a screen 21b to configure the settings relating to the copy function when the copy function is selected by the user. When the user of the terminal device 3 selects the copy function, the image processing device 2 sends the screen 21b as shown in FIG. 6B to the terminal device 3 and enables the terminal device 3 to display the screen 21b.

Figure 6C:
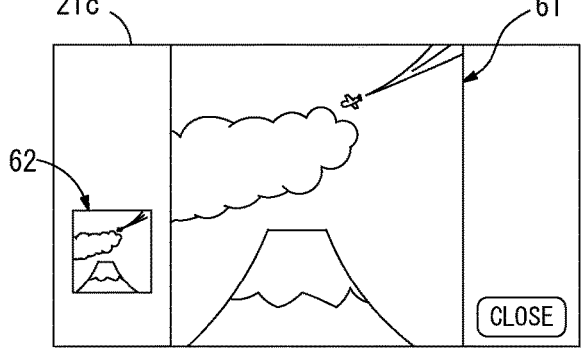

FIG. 6C shows a preview screen 21c when the user selects the box function and instructs the preview of the image data 22 stored in the storage 15. When the user of the terminal device 3 instructs the preview of the image data 22, the image processing device 2 sends the preview screen 21c as shown in FIG. 6C to the terminal device 3 and enables the terminal device 3 to display the preview screen 21c. The preview screen 21c includes a preview area 61 and a thumbnail area 62. A preview of the image data 22 is displayed in the preview area 61, and a thumbnail image of the image data 22 is displayed in the thumbnail area 62.

Figure 6D:
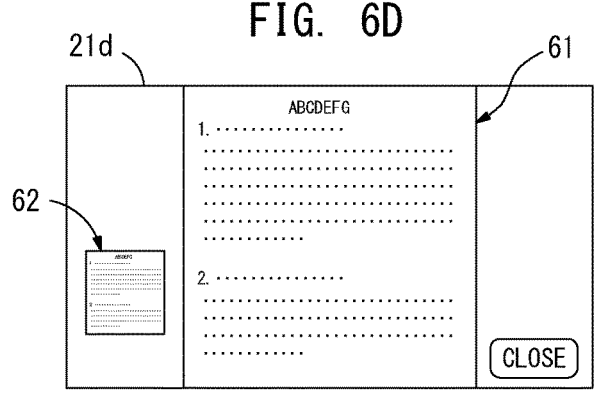

FIG. 6D shows a preview screen 21d when the user selects the box function and instructs the preview of the document data 23 stored in the storage 15. When the user of the terminal device 3 instructs the preview of the document data 23, the image processing device 2 sends the preview screen 21d as shown in FIG. 6D to the terminal device 3 and enables the terminal device 3 to display the preview screen 21d. The preview screen 21d includes the preview area 61 and the thumbnail area 62 as the same as the above-described preview screen 21c. The preview of the document data 23 is displayed in the preview area 61, and the thumbnail image of the document data 23 is displayed in the thumbnail area 62.

Figure 6E:
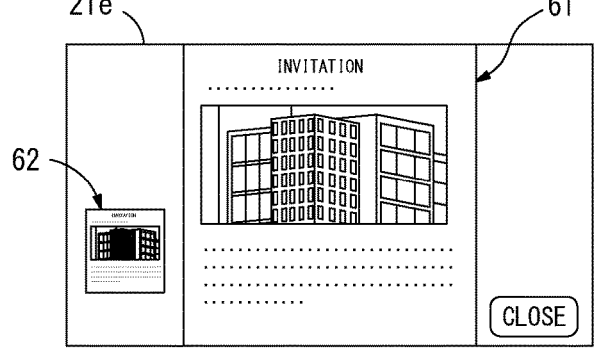

FIG. 6E shows a preview screen 21e when the user selects the box function and instructs the preview of the image data 22 stored in the storage 15. The image data 22, however, has a mix of an image part such as a picture and a document part. When the user of the terminal device 3 instructs the preview of the image data 22 which has the mix of the image and the document, the image processing device 2 sends the preview screen 21e as shown in FIG. 6E to the terminal device 3 and enables the terminal device 3 to display the preview screen 21e. The preview screen 21e includes the preview area 61 and the thumbnail area 62 as the same as the above-described preview screens 21*c* and 21*d*. The preview of the image data 22 is displayed in the preview area 61, and the thumbnail image of the image data 22 is displayed in the thumbnail area 62. It is assumed, for example, the image data 22 which has the mix of the image and the document is obtained by the scan function of the image processing device 2. In this case, the image part and the document part are identified at the reading of the document, and identification information to identify the image part and the document part is attached to the image data 22.

Figure 6F:
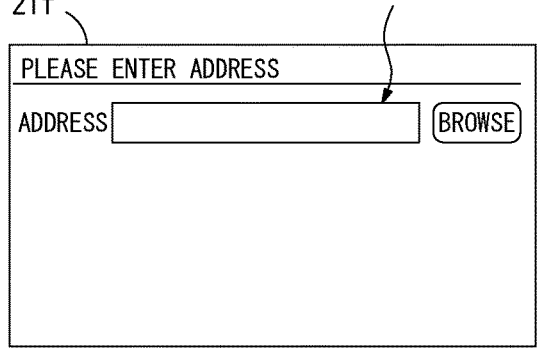

FIG. 6F shows an address setting screen 21*f* when the user selects the scan or the fax function. When the user of the terminal device 3 selects the scan or the fax function, the image processing device 2 sends the address setting screen 21*f* as shown in FIG. 6F to the terminal device 3 and enables the terminal device 3 to display the address setting screen 21*f*. The address setting screen 21*f* includes an address entry box 63 to show the address entered by the user.

The image processing device 2 creates a variety of screens based on the operation information received from the terminal device 3 and sends the created screen to the terminal device 3, thereby displaying the screen corresponding to the user operation on the display unit 40 of the terminal device 3. The screen sent to the terminal device 3 from the image processing device 2 may be other screens except for the screens shown in FIGS. 6A to 6F.

A detailed process performed after the screen analyzing part 32 and the cooperative application information generating part 33 are brought into operation when the image processing device 2 sends the screen to the terminal device 3 is described next.

FIGS. 7A, 7B and 7C show a process concept when the preview screen 21*c* is obtained by the screen obtaining part 31. The preview screen 21*c* as shown in FIG. 7A includes the preview area 61, the thumbnail area 62 and the operation key 64 as the contents. The preview of the image data 22 is displayed in the preview area 61, the thumbnail image of the image data 22 is displayed in the thumbnail area 62, and the operation key 64 is touched when the user would like to close the preview screen 21*c*. It is assumed that the screen obtained by the screen obtaining part 31 is the preview screen 21*c* as shown in FIG. 7A. In this case, the screen analyzing part 32 analyzes all the contents included in the preview screen 21*c*, and identifies the type of every content. The screen analyzing part 32 then reads the area identifying table 24 in the storage 15, and identifies the application which should be associated with each content.

FIG. 8 shows an example of the area identifying table 24. The type of the application that should be associated with each content type is defined in advance in the area identifying table 24. Multiple types of applications may be associated with the one of the contents. Three applications, "image browse," "image edit" and "email" are associated with the preview area based on the image data, for instance. Three applications, "image browse," "image edit" and "email" are also associated with the thumbnail area based on the image data, for instance. The screen analyzing part 32, therefore, determines whether or not the content with which the application is defined in the area identifying table 24 is included in the screen. The content with which the application is defined may be included in the screen. In this case, the screen analyzing part 32 associates the application defined in the area identifying table 24 with the content.

For the preview screen 21*c* as shown in FIG. 7A, for instance, the screen analyzing part 32 specifies three applications, "image browse," "image edit" and "email" as the applications that should be associated with the contents, the preview area 61 and the thumbnail area 62 included in the preview screen 21*c*. The content corresponding to the operation key 64 is not defined in the area identifying table 24. Thus, the screen analyzing part 32 does not associate any application with the content which is the operation key 64.

The screen analyzing part 32 then determines the area in the screen in which the content with which the application is associated is included based on the area identifying table 24. For the preview screen 21*c* as shown in FIG. 7A, for instance, the screen analyzing part 32 determines a rectangular area R1 corresponding to the preview area 61 and a rectangular area R2 corresponding to the thumbnail area 62.

The cooperative application information generating part 33 generates the cooperative application information 28 based on the analysis result by the screen analyzing part 32 as described above. To be more specific, the cooperative application information generating part 33 generates area determining information 28*a* based on the area determined by the screen analyzing part 32. The cooperative application information generating part 33 also obtains the application running information 25*b* of the application associated with each area in the application information 25, and generates the cooperative application information 28. For the preview screen 21*c* of FIG. 7A, for instance, the cooperative application information generating part 33 generates the area determining information 28*a* corresponding to the area R1 that includes the preview area 61 and the area R2 that includes the thumbnail area 62 as shown in FIG. 7C. The cooperative application information generating part 33 then obtains the application running information 25*b* in the application information 25 relating to the three applications, "image browse," "image edit" and "email" associated with the areas R1 and R2, and generates the cooperative application information 28. To be more specific, for the preview screen 21*c* of FIG. 7A, the cooperative application information 28 that associates the application running information 25*b* of the three applications, "image browse," "image edit" and "email" with each of the area R1 that includes the preview area 61 and the area R2 that includes the thumbnail area 62 is generated.

FIGS. 9A, 9B and 9C show a process concept when the preview screen 21*d* is obtained by the screen obtaining part 31. The preview screen 21*d* as shown in FIG. 9A includes the preview area 61, the thumbnail area 62 and the operation key 64 as the contents. The preview of the document data 23 is displayed in the preview area 61, the thumbnail image of the document data 23 is displayed in the thumbnail area 62, and the operation key 64 is touched when the user would like to close the preview screen 21*d*. It is assumed that the screen obtained by the screen obtaining part 31 is the preview screen 21*d* as shown in FIG. 9A. In this case, the screen analyzing part 32 analyzes all the contents included in the preview screen 21*d*, and identifies the content that requires running of the application on the terminal device 3 based on the area identifying table 24. The screen analyzing part 32 also associates the area including the identified content with the application that should be run on the terminal device 3. As a result, a rectangular area R3 corresponding to the preview area 61 and a rectangular area R4 corresponding to the thumbnail area 62 are determined as shown in FIG. 9A, and two applications, "document edit" and "email" are associated with the areas R3 and R4. The cooperative application information generating part 33 generates the cooperative application information 28 that associates the application running information 25*b* of the two applications, "document edit" and "email" with each of the area R3 that includes the preview area 61 and the area R4 that includes the thumbnail area 62 as shown in FIG. 9C.

FIGS. 10A, 10B and 10C show a process concept when the preview screen 21e which has the mix of the image and the document is obtained by the screen obtaining part 31. The preview screen 21e as shown in FIG. 10A includes the preview area 61, the thumbnail area 62 and the operation key 64 as the contents. The preview of the image data 22 which has the mix of the image and the document generated by reading of the document by the scanner section 16, for instance, is displayed in the preview area 61, the thumbnail image of the image data 22 is displayed in the thumbnail area 62, and the operation key 64 is touched when the user would like to close the preview screen 21e. It is assumed that the screen obtained by the screen obtaining part 31 is the preview screen 21e as shown in FIG. 10A. In this case, the screen analyzing part 32 analyzes all the contents included in the preview screen 21e based on the area identifying table 24. The screen analyzing part 32 identifies each of the contents by distinguishing the image part from the document part in the preview area 61 based on the identification information attached to the image data 22. The screen analyzing part 32 then identifies the content that requires the running of the application on the terminal device 3 based on the area identifying table 24. The screen analyzing part 32 also associates the area including the identified content with the application that should be run on the terminal device 3. As a result, an area R5, which is the document part, an area R6, which is the image part, and an area R7, which is the document part other than the area R5 are determined, and only an area R8 is determined for the thumbnail area 62 as shown in FIG. 10B. The two applications, "document edit" and "email" are associated with the areas R5 and R7. The three applications, "image browse," "image edit" and "email" are associated with the area R6. The four applications, "image browse," "document edit," "image edit" and "email" are associated with the area R8. The cooperative application information generating part 33 generates the cooperative application information 28 that associates the application running information 25b with the area determining information 28a of the respective areas R5, R6, R7 and R8 as shown in FIG. 10C.

FIGS. 11A, 11B and 11C show a process concept when the address setting screen 21f is obtained by the screen obtaining part 31. The address setting screen 21f as shown in FIG. 11A includes an address entry box 63 and the operation key 64 as the contents. The address entered by the user is displayed in the address entry box 63, and the operation key 64 is touched when the user would like to select the address from the address information registered in advance. It is assumed that the screen obtained by the screen obtaining part 31 is the address setting screen 21f as shown in FIG. 11A. In this case, the screen analyzing part 32 analyzes all the contents included in the address setting screen 21f based on the area identifying table 24, and identifies the content that requires running of the application on the terminal device 3. The screen analyzing part 32 also associates the area including the identified content with the application that should be run on the terminal device 3. The content of the address entry box 63, for example, allows the user to enter characters. The screen analyzing part 32, therefore, determines an area R9 for the address entry box 63 as shown in FIG. 11B, and associates the application, "character entry" with the determined area R9. It is assumed for example that the address entry box 63 only accepts numerical entry such as a fax number. In this case, the screen analyzing part 32 may attach information that indicates that the running mode of the "character entry" application is the numerical entry mode. It is also assumed for example that the address entry box 63 only accepts the entry of the texts such as an email address. In this case, the screen analyzing part 32 may attach information that indicates that the running mode of the "character entry" application is the text entry mode. As shown in FIG. 11C, the cooperative application information generating part 33 generates the area determining information 28a of the area R9. The cooperative application information generating part 33 also generates the cooperative application information 28 that associates the application running information 25b to run the "character entry" application with the generated area determining information 28a. The cooperative application information generating part 33 may attach the aforementioned information relating to the running mode to the application running information 25b.

The cooperative application information 28 generated for each screen as described above is sent to the terminal device 3 together with the screen. The terminal device 3 may detect the user operation as displaying the screen received from the image processing device 2. In this case, the terminal device 3 refers the cooperative application information 28, thereby identifying the application associated with the position where the user operated and automatically running the identified application.

Figure 12A:
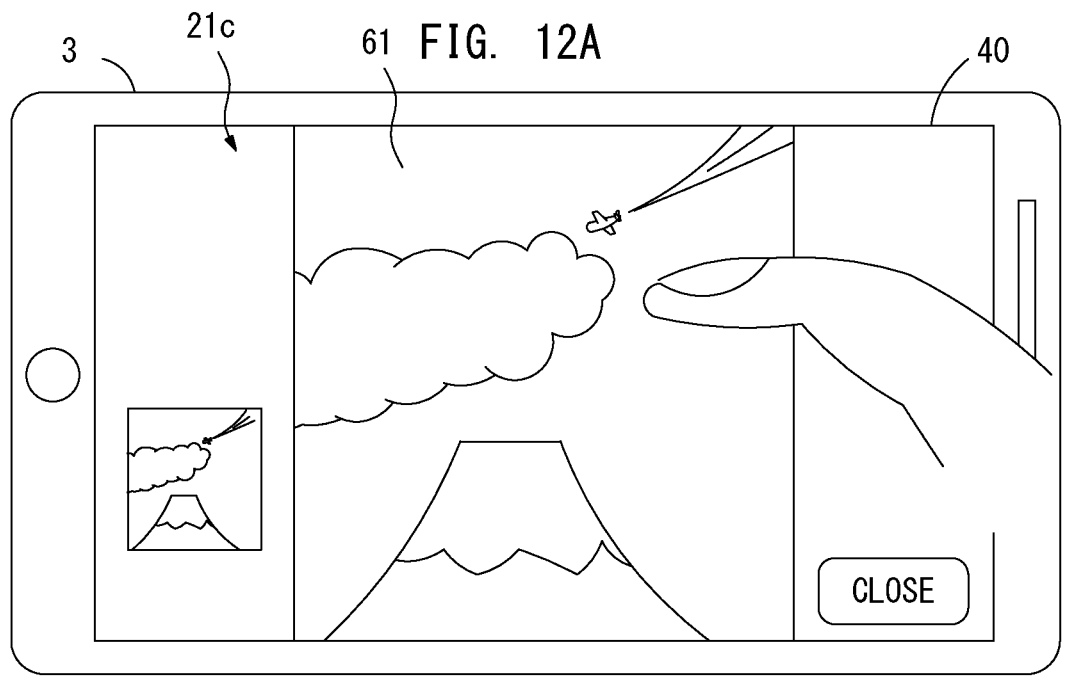
FIGS. 12A and 12B show an example of a way of running an application on the terminal device.
Figure 12B:
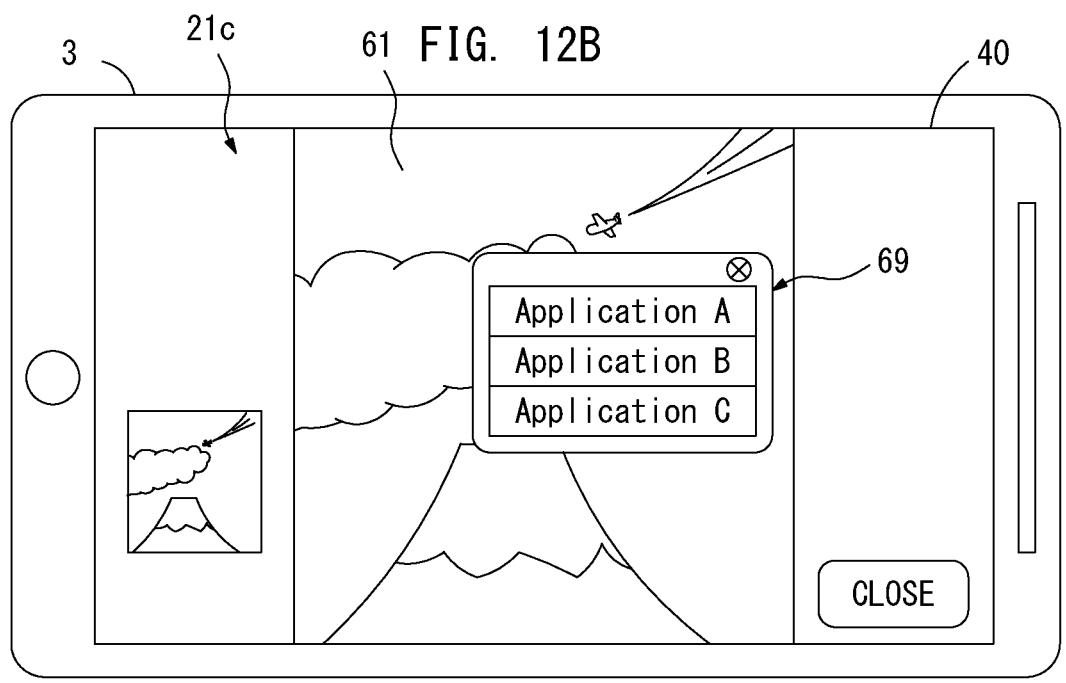

FIGS. 12A and 12B show an example of a way of running the application on the terminal device 3. It is assumed, for example, the user touches the preview area 61 as the preview screen 21c is displayed on the display unit 40 of the terminal device 3 as illustrated in FIG. 12A. In this case, the application determining part 57 refers the cooperative application information 28 based on the operated position where the user touched, thereby determining if the application running information 25b is associated with the preview area 61 which includes the operated position. In the cooperative application information 28 of FIG. 7C, the application running information 25b is associated with the preview area 61. The application determining part 57 then acknowledges that the application should be run on the terminal device 3 based on the cooperative application information 28, and brings the application running part 58 into operation.

The application running part 58 obtains the application running information 25b associated with the area (the preview area 61) including the operated position touched by the user in the cooperative application information 28, and outputs the obtained application running information 25b to the operating system 48. After obtaining the application running information 25b received from the remote control application 50, the operating system 48 returns the list of more than one application corresponding to the application running information 25b to the remote control application 50. The cooperative application information 28 of FIG. 7C, for instance, includes the application running information 25b corresponding to the three applications, "image browse," "image edit" and "email." The operating system 48 extracts all the application program 47 that includes with at least one of three functions from among the multiple application programs 47. The operating system 48 then returns the list of the extracted application to the remote control application 50.

It is assumed, for example, only one application is included in the list received from the operating system 48. In this case, the application running part 58 specifies the included application and outputs the running order to the operating system 48. Thus, the operating system 48 reads and executes the application program 47 in the storage 15 corresponding to the application specified by the application running part 58, thereby running the application working in concert with the remote control application 50.

Multiple applications may be included in the list received from the operating system 48. In this case, the cooperative application information 28 of FIG. 7C, for instance, includes the application running information 25b corresponding to the three applications, "image browse," "image edit" and "email." Thus, the application running part 58 obtains the list including the three applications from the operating system 48. In such a case, the application running part 58 brings the display controller 53 into operation, for example, to enable the display of a list of the applications included in the list obtained from the operating system 48 on the display unit 40 as shown in FIG. 12B. The list 69 is displayed near the operated position where the user touched, for example. The application running part 58 receives the user operation to select one of the multiple applications included in the list 69. In response to receiving the user operation to select, the application running part 58 specifies the application thereby selected and outputs the running order to the operating system 48. Thus, the operating system 48 reads and executes the application program 47 in the storage 15 corresponding to the application specified by the application running part 58, thereby running the application working in concert with the remote control application 50.

The multiple applications may be included in the list received from the operating system 48. In this case, the application running part 58 displays the list 69 as described above. Moreover, the application running part 58 may automatically select the application set as default and output the running order to the operating system 48 if there is any application set as default in advance to run of the multiple applications included in the list without displaying the list. In such a case, the user is not required to select one of the multiple applications, resulting in less burden for running the application.

Figure 13A:
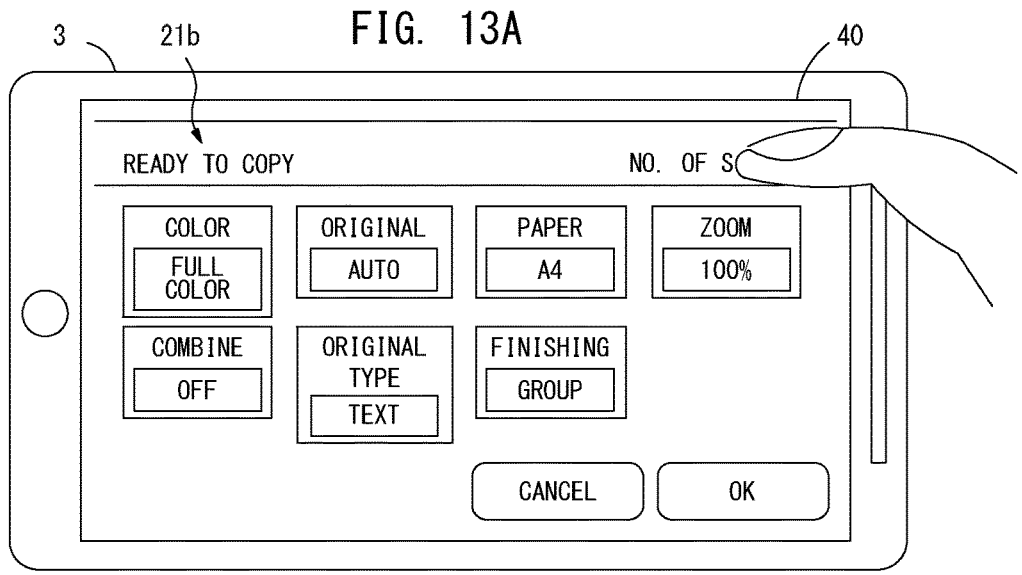
FIGS. 13A, 13B and 13C show an example of another way of running the application on the terminal device.
Figure 13B:
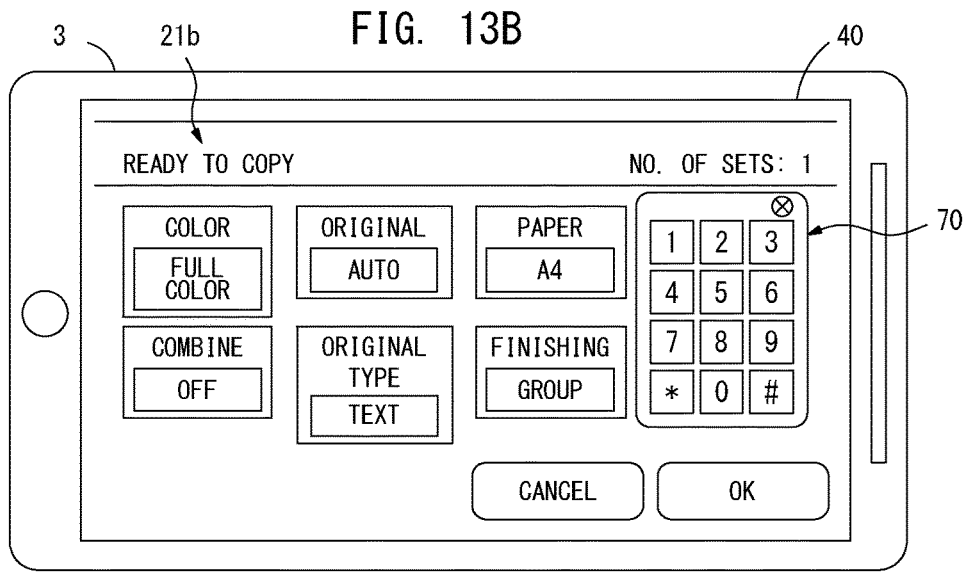
Figure 13C:
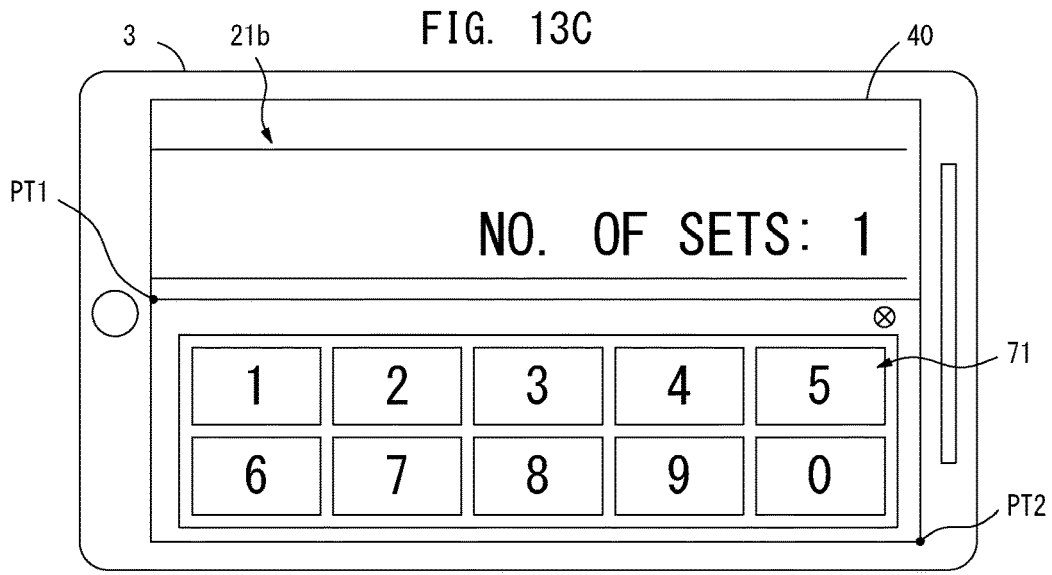

FIGS. 13A, 13B and 13C show an example of another way of running the application on the terminal device 3. It is assumed, for example, the user touches a box showing copies (hereafter, copies box) as the screen 21d to configure setting relating to the copy function is displayed on the display unit 40 of the terminal device 3 as illustrated in FIG. 13A. In this case, the application determining part 57 refers the cooperative application information 28 based on the position where the user touched, thereby determining if the application running information 25b is associated with the copies box which is the area including the operated position. The application running information 25b relating to "character entry" may be associated with the copies box, for instance. The application determining part 57 then brings the application running part 58 into operation. The application running part 58 outputs the application running information 25b to the operating system 48, and outputs the order to enable running of the application, "character entry" such as an IME based on the list obtained from the operating system 48. As a result, the application, "character entry" is run on the terminal device 3, and a keyboard screen 70 for the user to enter the characters is displayed as illustrated in FIG. 13B.

When outputting the running order to the operating system 48, the application running part 58 attaches information relating to the operated position where the user touched as a parameter of the running order (running parameter). As a result, the keyboard screen 70 may be displayed near the user operated position as illustrated in FIG. 13B when the application, "character entry" is run on the terminal device 3, resulting in improvement in the operability for the keyboard screen 70.

Besides the aforementioned case, when outputting the running order to the operating system 48, the application running part 58 may identify a half area of the display unit 40 and instruct the area of the screen to the application as the parameter of the running order. The application running part 58 may display enlarged image of the area around the operated position where the user touched on the screen 21d displayed on the display unit 40 in the area of other half of the screen of the display unit 40. FIG. 13C shows the example of such display of the screen. To be more specific, for outputting the running order to the operating system 48, the application running part 58 identifies the half area of the screen of the display unit 40 and instructs to display the keyboard screen 71 to the operating system 48. Moreover, the application running part 58 instructs to display the enlarged image of the area around the operated position in the screen 21d in the area of other half of the screen of the display unit 40 to the display controller 53. As a result, after the application is run on the terminal device 3, the display controller 53 is allowed to display the screen displayed by the application on the half of the screen of the display unit 40 and the screen obtained from the image processing device 2 on the other half of the screen of the display unit 40. To be more specific, when the application, "character entry" is run on the terminal device 3, the enlarged copies box which is touched by the user is displayed in the upper area of the display unit 40 and the enlarged keyboard screen 71 is displayed in the lower area of the display unit 40 as illustrated in FIG. 13C. Hence, even if the terminal device 3 is a device having a relatively small size of the screen such as a smartphone, the user is allowed to operate it easily. For instructing the display area of the screen of the application to the operating system 48, the application running part 58 may designate two points PT1 and PT2 placed diagonally to the area as shown in FIG. 13C, for example. This running way may be applied when the address entry box 63 is touched by the user as the address setting screen 21f is displayed as illustrated in FIG. 11A.

For running the application, "character entry," the application running part 58 may specify either the numerical entry mode or the text entry mode for the running mode as the parameter of the running order. As a result, the application running part 58 is allowed to select and display the keyboard screen for the numerical entry or for the text entry when running the application, "character entry." Hence, the user is not required to switch the display manner of the keyboard screen, resulting in further improvement in the operability.

Figure 14A:
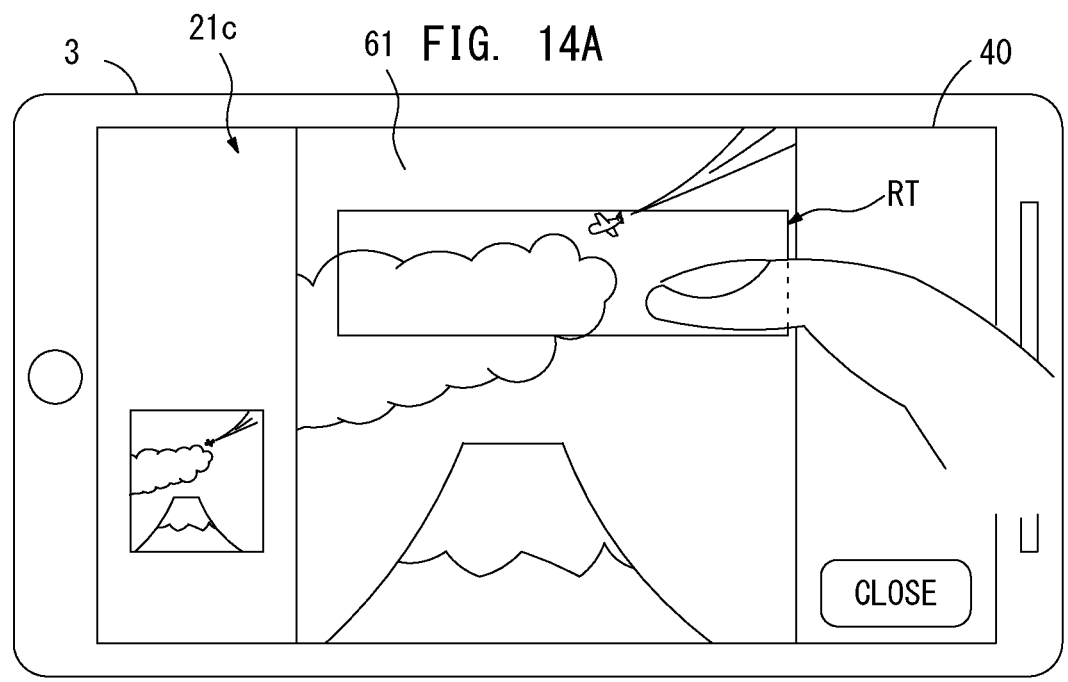
FIGS. 14A and 14B show an example of another way of running the application on the terminal device.
Figure 14B:
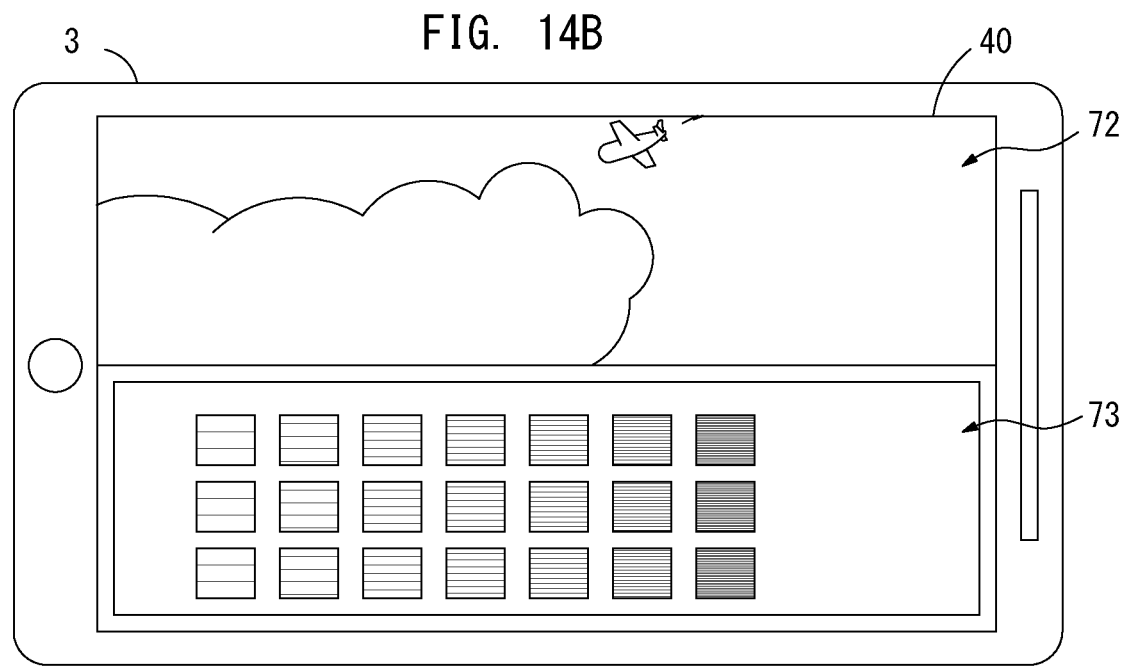

FIGS. 14A and 14B show an example of another way of running the application on the terminal device 3. It is assumed, for example, the user touches the preview area 61 as the screen 21c is displayed on the display unit 40 of the terminal device 3, then the application running part 58 runs the application, "image edit." For outputting the running order to run the application, "image edit" to the operating system 48, the application running part 58 identifies a trimming area RT including the operated position touched by the user as the parameter of the running order as illustrated in FIG. 14A. Also, the area for displaying the trimming area RT on the display unit 40 may be designated. The operating system 48 then runs the application, "image edit" based on the parameter. The application, "image edit" clips the image of the trimming area RT from the whole image displayed in the preview area 61, and displays an enlarged clipped trimming image 72 in the designated area of the display unit 40 as shown in FIG. 14B. The application, "image edit" also displays the screen 73 for image edit in the area different from the trimming image 72. The preview screen 21c obtained from the image processing device 2 is moved to a background of the trimming image 72 and the screen 73 displayed by the application, "image edit." To be more specific, as the application, "image edit" is run, the display controller 53 displays the screen displayed by the application on the front of the display unit 40, and moves the screen obtained from the image processing device 2 to the background of the screen. It is assumed for example that the user gives the instruction to edit image. In this case, the application running part 58 makes the initial screen of the application go full-screen on the display unit 40, and zooms in the part that the user focuses for display. As a result, the user is allowed to start the edit operation smoothly, resulting in improvement in the operability. This running way may be applied not only for the image edit, but also the document edit specified by the user.

Figure 15:
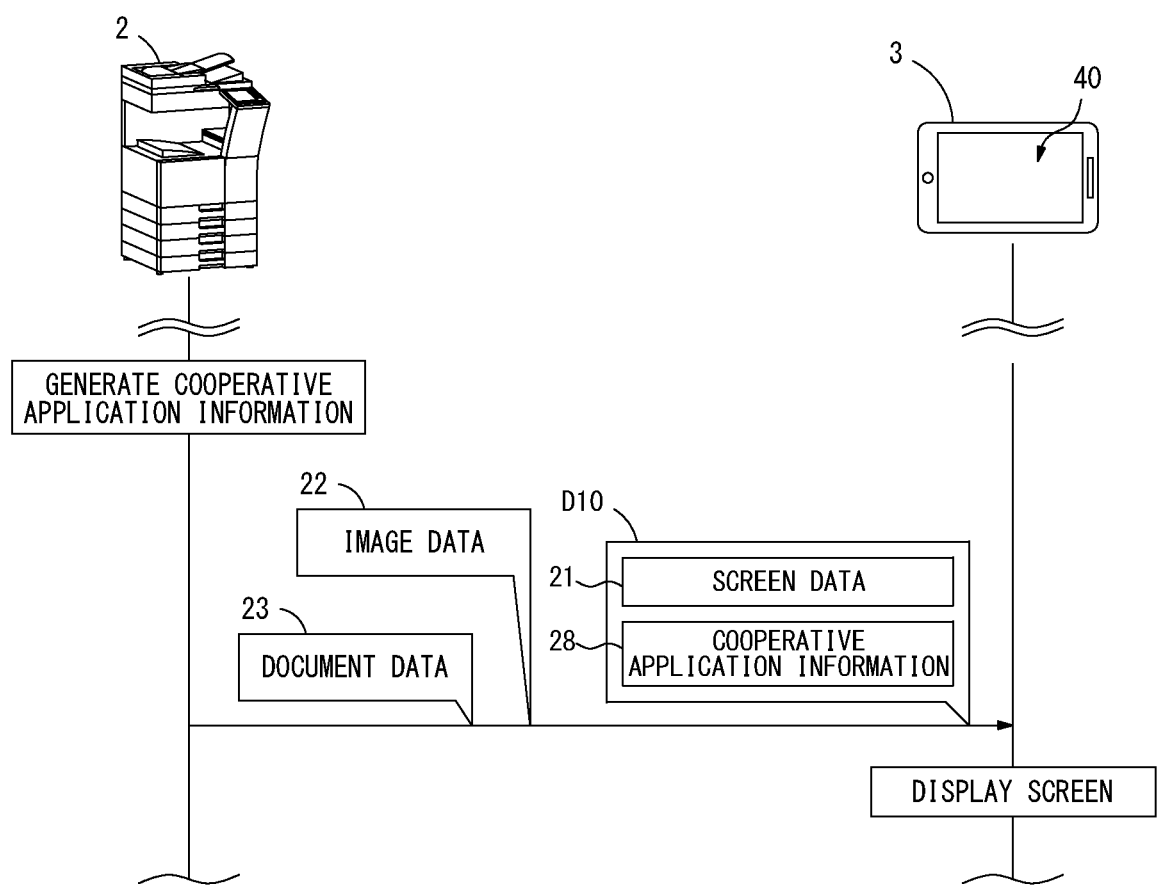
FIG. 15 shows an example of sending original data together with the screen by the image processing device.

It is assumed that the application, "image edit" or "document edit" is run on the terminal device 3 in response to receiving the user operation. In this case, the application preferably performs the edit process based on the original image data 22 or the document data 23 stored in the image processing device 2. When the image processing device 2 sends the data D10 including the screen (for example, preview screens 21c, 21d and 21e) that enables the user to instruct "image edit" or "document edit" to the terminal device 3, it may also send the original image data 22 or the document data 23 to edit to the terminal device 3 together with the screen as shown in FIG. 15. In this case, after the area to instruct "image edit" or "document edit" is operated by the user, the terminal device 3 is allowed to cause the application, "image edit" or "document edit" thereby run to perform the edit process based on the original image data 22 or the document data 23. In a similar way, for sending the data D10 including the screen (for example, the preview screens 21c, 21d and 21e) that enables the user to instruct "email" to the terminal device 3, the image processing device 2 may send in advance the original image data 22 or the document data 23 to be the attachment to the email to the terminal device 3. After the application "email" is run in response to receiving the user operation, the terminal device 3 is allowed to enable the application to automatically create the email with the attachment of the original image data 22 or the document data 23.

Figure 16:
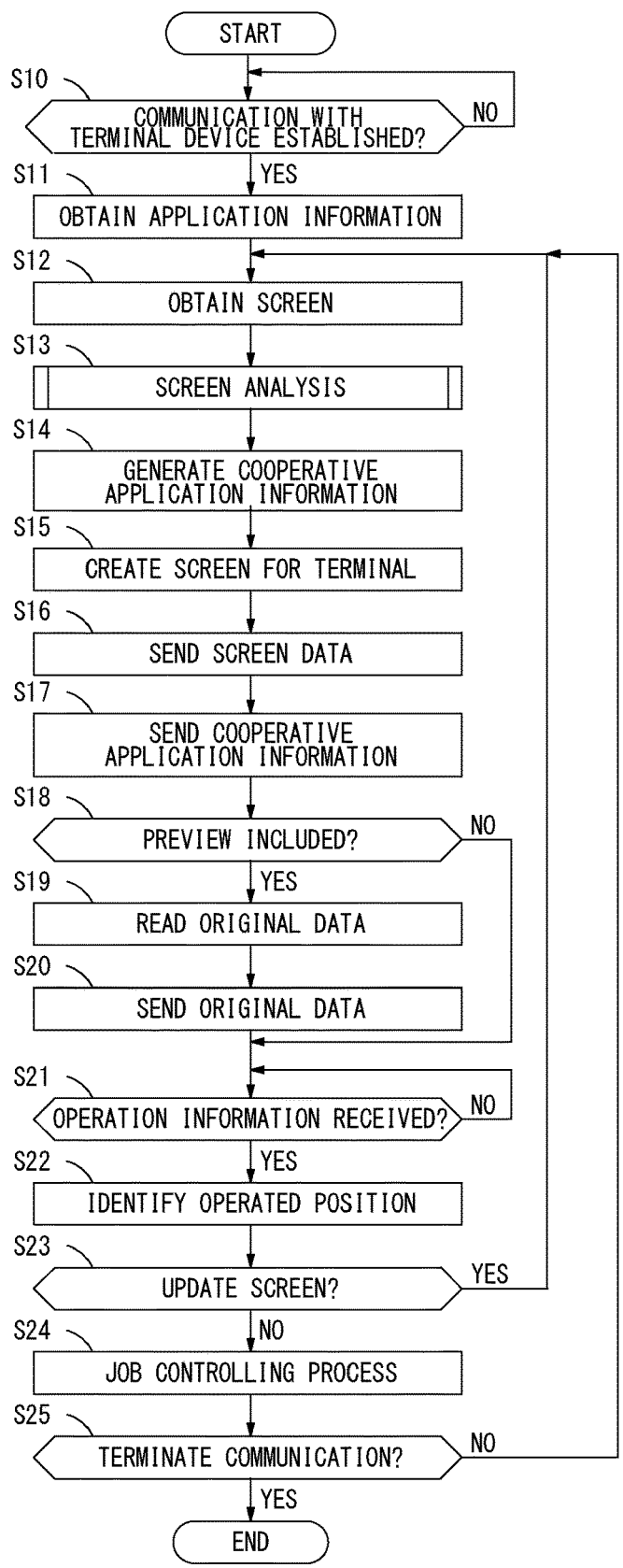
FIG. 16 is a flow diagram explaining an exemplary sequential procedure of the process performed at the image processing device.

A detailed procedure of the process performed at the image processing device 2 of the image processing system 1 as described above is described next. FIG. 16 is a flow diagram explaining an exemplary sequential procedure of the process performed at the image processing device 2. This process is performed when the controller 19 of the image processing device 2 executes the program 20. Upon start of the process, the image processing device 2 waits until the communication CN with the terminal device 3 is established (step S10). After establishing the communication CN, the image processing device 2 obtains the application information 25 from the terminal device 3 (step S11). The image processing device 2 then obtains the screen to display at the terminal device 3 (step S12). The initial screen 21a to be displayed at the terminal device 3 is obtained in step S12 if it is soon after the communication CN with the terminal device 3 is established. After obtaining the screen, the image processing device 2 performs the screen analysis to analyze the screen (step S13).

Figure 17:
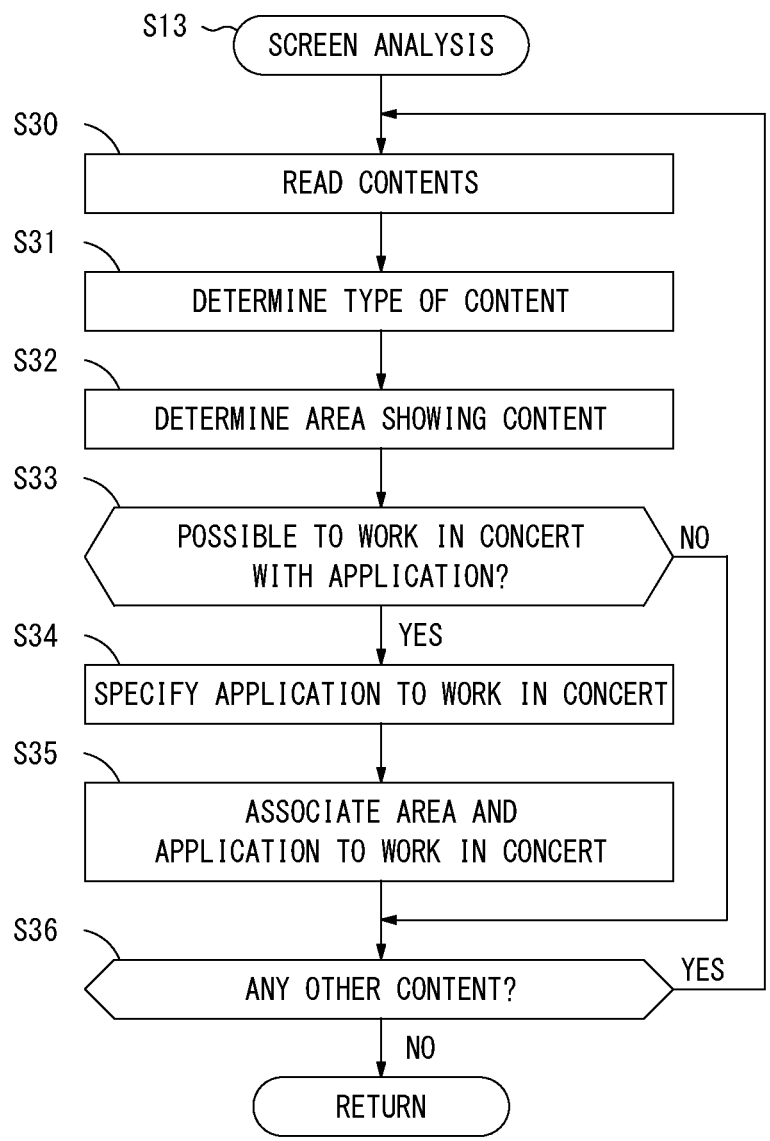
FIG. 17 is a flow diagram explaining an exemplary detailed sequential procedure of a screen analysis.

FIG. 17 is a flow diagram explaining an exemplary detailed sequential procedure of the screen analysis (step S113). Upon the start of the process, the image processing device 2 reads one of the contents contained in the screen obtained to send to the terminal device 3 (step S30), and determines the type of the content (step S31). The image processing device 2 determines the area in which the content is displayed in the screen (step S32), and determines if the content is stated that is allowed to work in concert with another application in the area identifying table 24 (step S33). As a result, the content may be allowed to work in concert with another application (when a result of step S33 is YES). In this case, the image processing device 2 specifies the application that works in concert with the content based on the area identifying table 24, and associates the area in which the content is displayed and the application with each other (step S35). The cooperation between the content and the application may not be stated in the area identifying table 24 (when a result of step S33 is NO). In this case, the image processing device 2 skips the process in steps S34 and S35. The image processing device 2 then determines if the screen contains another content (step S36). Another content may be contained (when a result of step S36 is YES). In this case, the image processing device 2 returns to the process in step S30 and repeats the above-described process. After performing the process in steps S30 to S35 for every content contained in the screen, the screen analysis completes.

Referring back to FIG. 16, the image processing device 2 generates the cooperative application information 28 (step S14) based on the result of the screen analysis (step S13). The image processing device 2 converts the screen obtained in step S12 into the JPEG data or the bitmap data, thereby creating the screen for the display at the terminal device (step S15). The image processing device 2 then sends the screen data 21 based on the screen to the terminal device 3 (step S6). The image processing device 2 sends the cooperative application information 28 corresponding to the screen to the terminal device 3 together with the screen data 21 of the screen (step S17).

The image processing device 2 determines if the screen sent to the terminal device 3 includes the preview of the image data 22 or the document data 23 (step S18). The preview may be included (when a result of step S18 is YES). In this case, the image processing device 2 reads the image data 22 or the document data 23 in the storage 15 which is the original data (step S19), and sends the original data to the terminal device 3 (step S20). The preview of the image data 22 or the document data 23 may not be included in the screen sent to the terminal device 3 (when a result of step S18 is NO). In this case, the image processing device 2 skips the process in steps S19 and S20.

The image processing device 2 then waits until receiving the operation information from the terminal device 3 (step S21). After receiving the operation information (when a result of step S21 is YES), the image processing device 2 identifies the operated position touched by the user in the screen based on the operation information (step S22). Thus, what operation is made by the user of the terminal device 3 can be identified. The image processing device 2 determines whether or not to update the screen displayed at the terminal device 3 to another screen (step S23). For updating the screen (when a result of step S23 is YES), the image processing device 2 returns to the process in step S12 and repeats the above-described process. The screen is not updated (when a result of step S23 is NO), the image processing device 2 brings the job controller 37 into operation and configures the settings about the job based on the user operation and/or controls the job execution (step S24). The image processing device 2 then determines whether or not to terminate the communication CN with the terminal device 3 (step S25). When the communication CN is not terminated, the image processing device 2 returns to the process in step S12 and repeats the above-described process. When terminating the communication CN with the terminal device 3 (step S25), the image processing device 2 competes the process.

Figure 18:
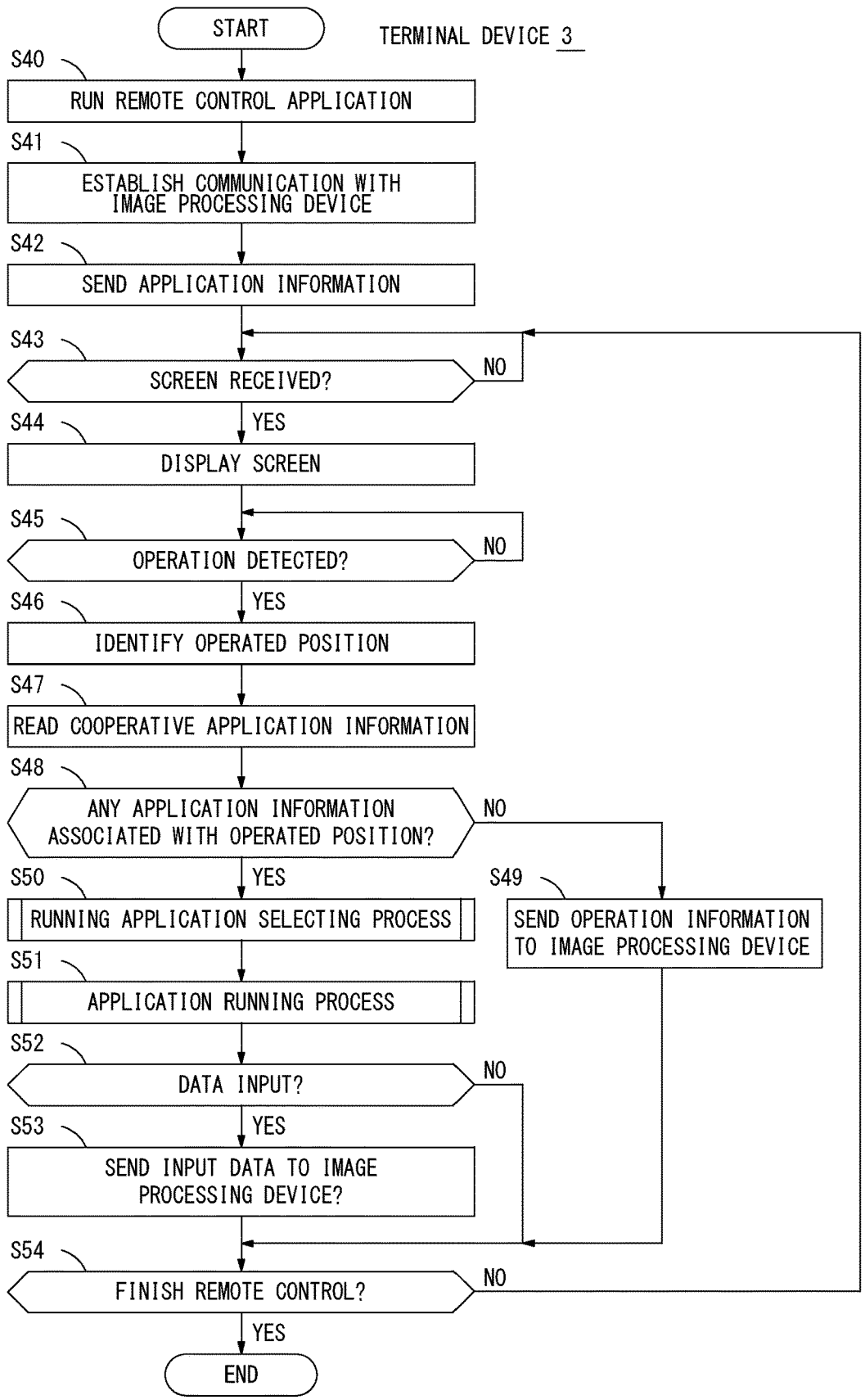
FIG. 18 is a flow diagram explaining an exemplary sequential procedure of the process performed at the terminal device.

A detailed procedure of the process performed at the terminal device 3 is described next. FIG. 18 is a flow diagram explaining an exemplary sequential procedure of the process performed at the terminal device 3. This process is performed when the controller 45 of the terminal device 3 executes the remote control program 46 and the remote control application 50 is run on the controller 45 (step S40). After running the remote control application 50, the terminal device 3 starts the communication with the image processing device 2 and establishes the communication CN with the image processing device 2 (step S41). In response to receiving the request for the application information from the image processing device 2, the terminal device 3 executes the application program 47, thereby sending the application information 25 relating to the application that may be run to the image processing device 2 (step S42).

The terminal device 3 waits until receiving the screen from the image processing device 2 (step S43). After receiving the screen (when a result of step S43 is YES), the terminal device 3 displays the received screen on the display unit 40 (step S44). The terminal device 3 temporarily stores the cooperative application information 28 received together with the screen in the storage such as the memory and manages. When receiving the original data such as the image data 22 or the document data 23 after the screen, the terminal device 3 temporarily stores the received original data in the storage such as the memory and manages.

The terminal device 3 may detect the user operation as displaying the screen received from the image processing device 2 (when a result of step S45 is YES). In this case, the terminal device 3 identifies the operated position touched by the user on the screen (step S46). The terminal device 3 then reads the cooperative application information 28 received with the screen (step S47), and determines if the application running information 25b is associated with the area including the operated position touched by the user (step S48). No application running information 25b may be associated with the area including the operated position touched by the user (when a result of step S48 is NO). In this case, the terminal device 3 generates the operation information based on the user operation, and sends the generated operation information to the image processing device 2 (step S49). As a result, the process based on the user operation may be performed at the image processing device 2.

The application running information 25b may be associated with the area including the operated position touched by the user (when a result of step S48 is YES). In this case, the terminal device 3 brings the application running part 58 into operation. The application running part 58 performs a running application selecting process at first (step S50), then performs an application running process (step S51).

Figure 19:
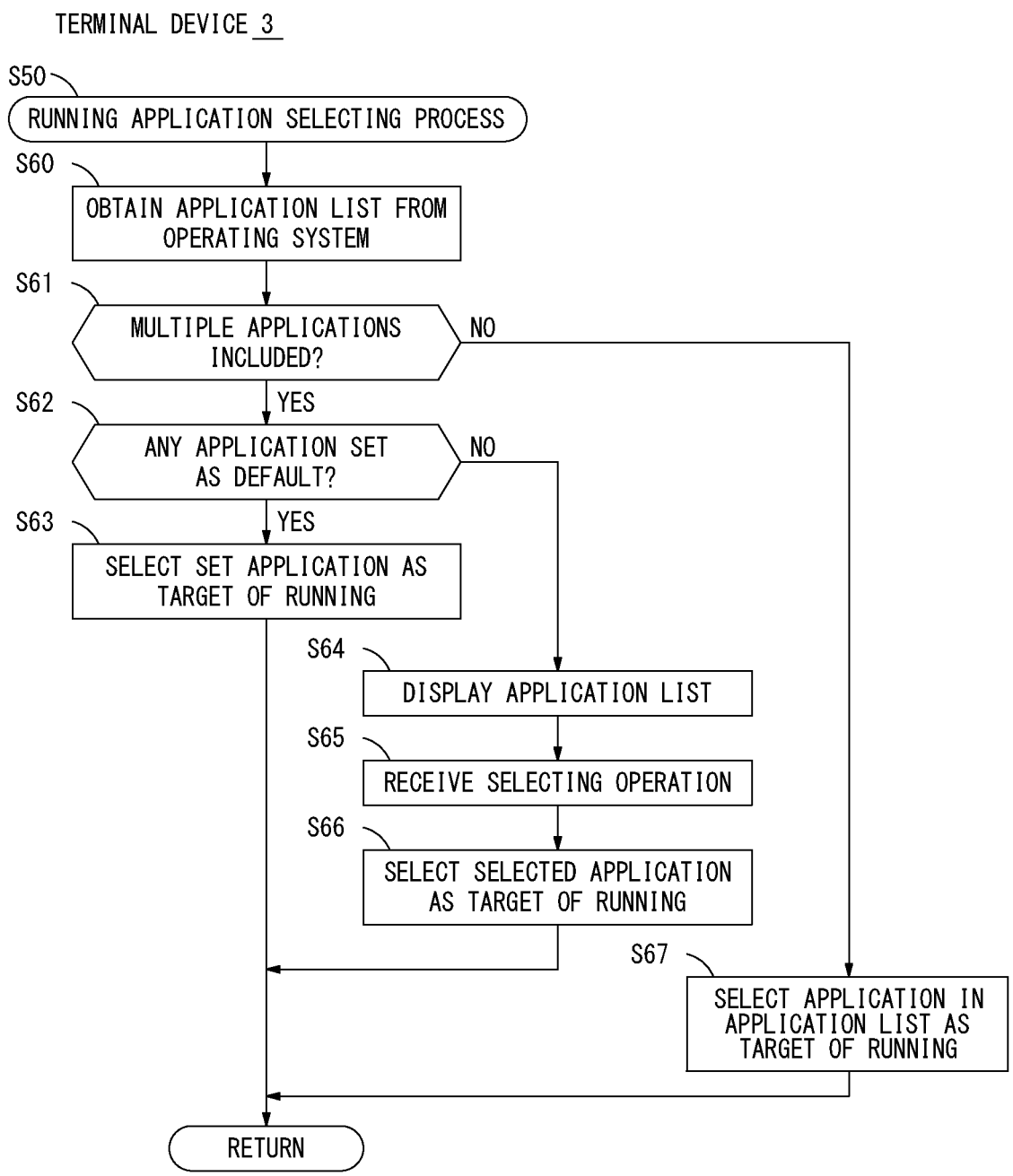
FIG. 19 is a flow diagram explaining an exemplary detailed sequential procedure of a running application selecting process.

FIG. 19 is a flow diagram explaining an exemplary detailed sequential procedure of the running application selecting process (step S50). Upon the start of the process, the application running part 58 obtains the application running information 25b associated with the area including the operated position touched by the user in the cooperative application information 28, and outputs the obtained application running information 25b to the operating system 48. The application running part 58 then obtains the list of the application corresponding to the application running information 25b from the operating system 48 (step S60). The application running part 58 determines if the multiple applications are included in the list obtained from the operating system 48 (step S61). When the multiple applications are included (when a result of step S61 is YES), the application running part 58 determines whether or not the application set as default as the target of running is included in the multiple applications (step S62). The application set as default as the target of running may be included (when a result of step S62 is YES). In this case, the application running part 58 selects one of the applications set as default as the target of running (step S63).

The application set as default as the target of running may not be included in the multiple applications in the list (when a result of step S62 is NO). In this case, the application running part 58 displays the list of the applications that should be run depending on the operated position touched by the user (step S64). The application running part 58 then receives the user operation to select (step S65). The application running part 58 selects one of the applications selected by the user from among the multiple applications in the list as the target of running (step S66).

Only one application may be included in the list obtained from the operating system 48 (when a result of step S61 is NO). In this case, the application running part 58 selects the application as the target of running (step S67). By performing the above-described process, the application running part 58 is allowed to identify one application to run on the terminal device 3 based on the user operation.

Figure 20:
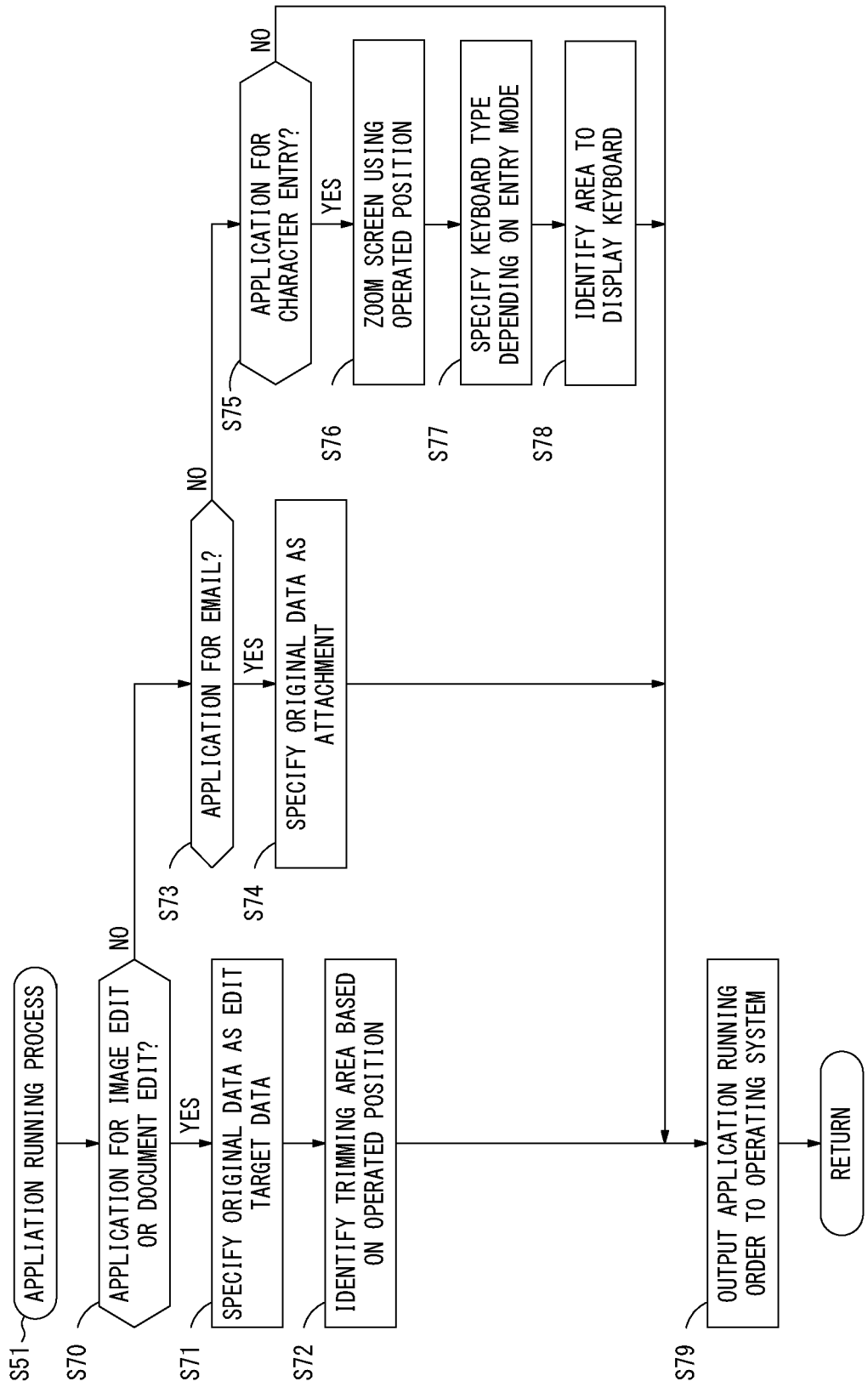
FIG. 20 is a flow diagram explaining an exemplary detailed sequential procedure of an application running process.

FIG. 20 is a flow diagram explaining an exemplary detailed sequential procedure of the application running process (step S51). Upon the start of the process, the application running part 58 determines if the application selected as the target of running in the running application selecting process (step S50) is for the image edit or the document edit (step S70). It is assumed that the application for the image edit or the document edit is selected as the target of running (when a result of step S70 is YES). In this case, the application running part 58 reads the original data obtained in advance from the image processing device 2, and specifies the original data as edit target data for the application (step S71). The application running part 58 identifies the trimming area RT of the original data based on the operated position touched by the user, and sets the parameter to run the application for the image edit or the document edit (step S72).

It is assumed that the application selected as the target of running is not for the image edit or the document edit (when a result of step S70 is NO). In this case, the application running part 58 determines the application for transmission and receipt of the email is selected as the target of running (step S73). The application for transmission and receipt of the email may be selected as the target of running (when a result of step S73 is YES). In this case, the application running part 58 reads the original data obtained in advance from the image processing device 2, and designates the original data as the attachment. The application running part 58 then sets the parameter to run the application for the email (step S74).

The application selected as the target of running may not be the email either (when a result of step S73 is NO). In this case, the application running part 58 determines whether or not the application for character entry is selected as the target of running (step S75). The application for character entry may be selected as the target of running (when a result of step S75 is YES). In this case, the application running part 58 performs the process to zoom the current screen using the operated position touched by the user as the reference point for display (step S76). The application running part 58 then specifies the keyboard type either the keyboard screen for the numerical entry or for the text depending on the entry mode of the content placed at the operated position touched by the user (step S77). The application running part 58 identifies the area to display the keyboard screen, and sets the parameter to run the application for the character entry (step S78). If the application selected as the target of running is none of the aforementioned application (when a result of step S73 is NO), the application running part 58 moves on to the process in step S79.

The application running part 58 outputs the application running order to the operating system 48 to run the application selected as the target of running (step S79). The application running order output to the operating system 48 includes the parameter set in the respective steps as described above. If another application that works in concert with the remote control application is run on the terminal device 3, the initial screen displayed by another application may be the user-friendly screen.

As described above, the image processing device 2 of the image processing system 1 of the first preferred embodiment is capable of sending the screen to the terminal device 3 and enabling the terminal device 3 to display the screen. The image processing device 2 is configured to determine in advance the application to run on the terminal device 3 based on the screen to send to the terminal device 3, and send the application running information 25b corresponding to the determination result to the terminal device 3 together with the screen. On the other hand, the terminal device 3 is configured to display the screen received from the image processing device 2 on the display unit 40, and automatically run the application based on the application running information 25b received with the screen from the image processing device 2 in response to detecting the user operation. As described above, in response to detecting the user operation as displaying the screen, the terminal device 3 runs the application based on the application running information 25b corresponding to the screen without sending the operation information to the image processing device 2, and enables the application to perform the process corresponding to the user operation. Hence, it is not necessary for the image processing device 2 to perform all the process corresponding to the user operation made at the terminal device 3. As a result, the process burden on the image processing device 2 may be reduced, resulting in improvement in the job execution efficiency at the image processing device 2.

As described above, the application may be run on the terminal device based on the user operation to the terminal device. Moreover, the process corresponding to the user operation may be performed at the terminal device. As a result, the process burden on the image processing device is allowed to be reduced.

Second Preferred Embodiment

The second preferred embodiment is explained next. For sending the screen to the terminal device 3, the image processing device 2 of the above-described first preferred embodiment sends the cooperative application information 28 with the screen in advance to the terminal device 3 so that the terminal device 3 is allowed to run the application based on the cooperative application information 28 without sending the operation information to the image processing device 2 when detecting the user operation. On the other hand, in the second preferred embodiment, the image processing device 2 does not send the cooperative application information 28 together with the screen to the terminal device 3. When the user operation is detected at the terminal device 3, the image processing device 2 obtains the operation information from the terminal device 3 and determines the application to run on the terminal device 3. The image processing device 2 then sends the application running information 25b to the terminal device 3 based on the determination result, thereby enabling the terminal device 3 to run the application. The structural concept of the image processing system 1 of the second preferred embodiment is the same as that explained in the first preferred embodiment.

Figure 21:
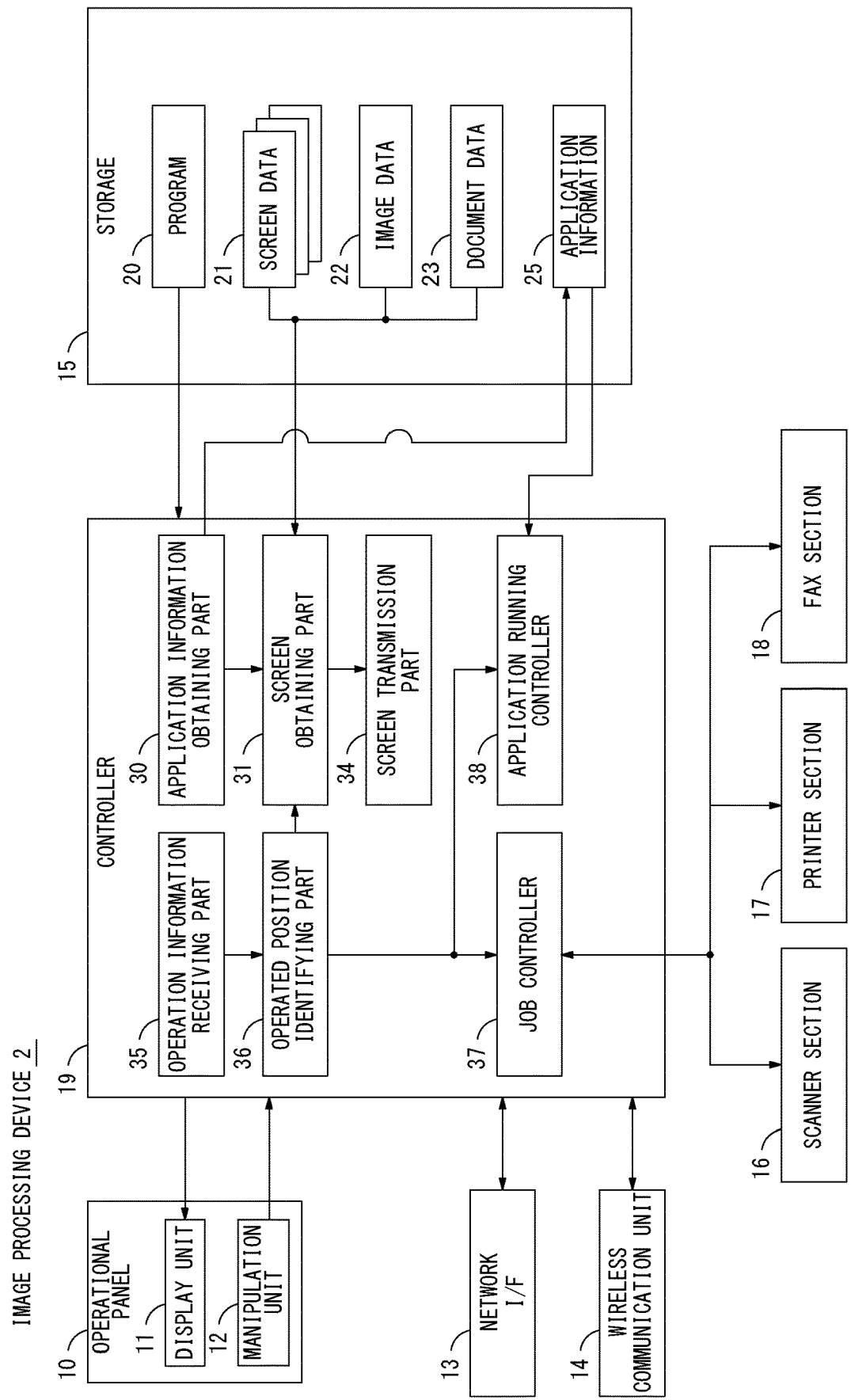
FIG. 21 is a block diagram showing an example of a hardware structure and that of a functional structure of the image processing device of a second preferred embodiment.

FIG. 21 is a block diagram showing an example of a hardware structure and that of a functional structure of the image processing device 2 of the second preferred embodiment. The image processing device 2 of the second preferred embodiment has the same hardware structure as that of the first preferred embodiment. The CPU reads and executes the program 20 so that the controller 19 serves as the application information obtaining part 30, the screen obtaining part 31, the screen transmission part 34, the operation information receiving part 35, the operated position identifying part 36, the job controller 37 and an application running controller 38.

The application information obtaining part 30 obtains the application information 25 relating to the application that may be run on the terminal device 3 at the beginning of the communication with the terminal device 3, which is the same as the first preferred embodiment. The screen obtaining part 31 reads the screen data 21 in the storage 15, thereby obtaining the screen to display at the terminal device 3 and outputting the screen to the screen transmission part 34. The screen transmission part 34 sends the screen obtained by the screen obtaining part 31 to the terminal device 3. To be more specific, according to the second preferred embodiment, after the screen to send to the terminal device 3 is obtained by the screen obtaining part 31, the process to analyze the screen and/or to generate the cooperative application information 28 corresponding to the screen is not performed as in the first preferred embodiment. According to the second preferred embodiment, the screen obtained by the screen obtaining part 31 is immediately sent to the terminal device 3.

After receiving the operation information from the terminal device 3, the operation information receiving part 35 outputs the received operation information to the operated position identifying part 36. The operated position identifying part 36 identifies the operated position, for example, touched by the user of the terminal device 3 based on the operation information, and determines what operation is made by the user depending on the operated position.

It is assumed for example that the operation made by the user of the terminal device 3 is to give the instruction to configure the setting about the job or to start the execution of the job. In this case, the operated position identifying part 36 brings the job controller 37 into operation. The job controller 37 configures the setting about the job or controls the execution of the job specified by the user by operating the scanner section 16, the printer section 17 or the fax section 18 in response to the user operation.

The screen displayed at the terminal device 3 may be necessary to be updated in response to the user operation at the terminal device 3. In this case, the operated position identifying part 36 orders the screen obtaining part 31 to update the screen. The screen obtaining part 31 reads again the screen data 21 in the storage 15 and obtains the screen for update, then outputs the screen to the screen transmission part 34. Thus, the screen transmission part 34 sends the screen for update to the terminal device 3.

It is assumed for example that the operation made by the user of the terminal device 3 is to give the instruction to run the application. In this case, the operated position identifying part 36 brings the application running controller 38 into operation. The application running controller 38 obtains the application running information 25*b* in the application information 25 based on the operated position touched by the user in the screen and sends the obtained application running information 25*b* to the terminal device 3, thereby enabling the terminal device 3 to run the application.

Figure 22:
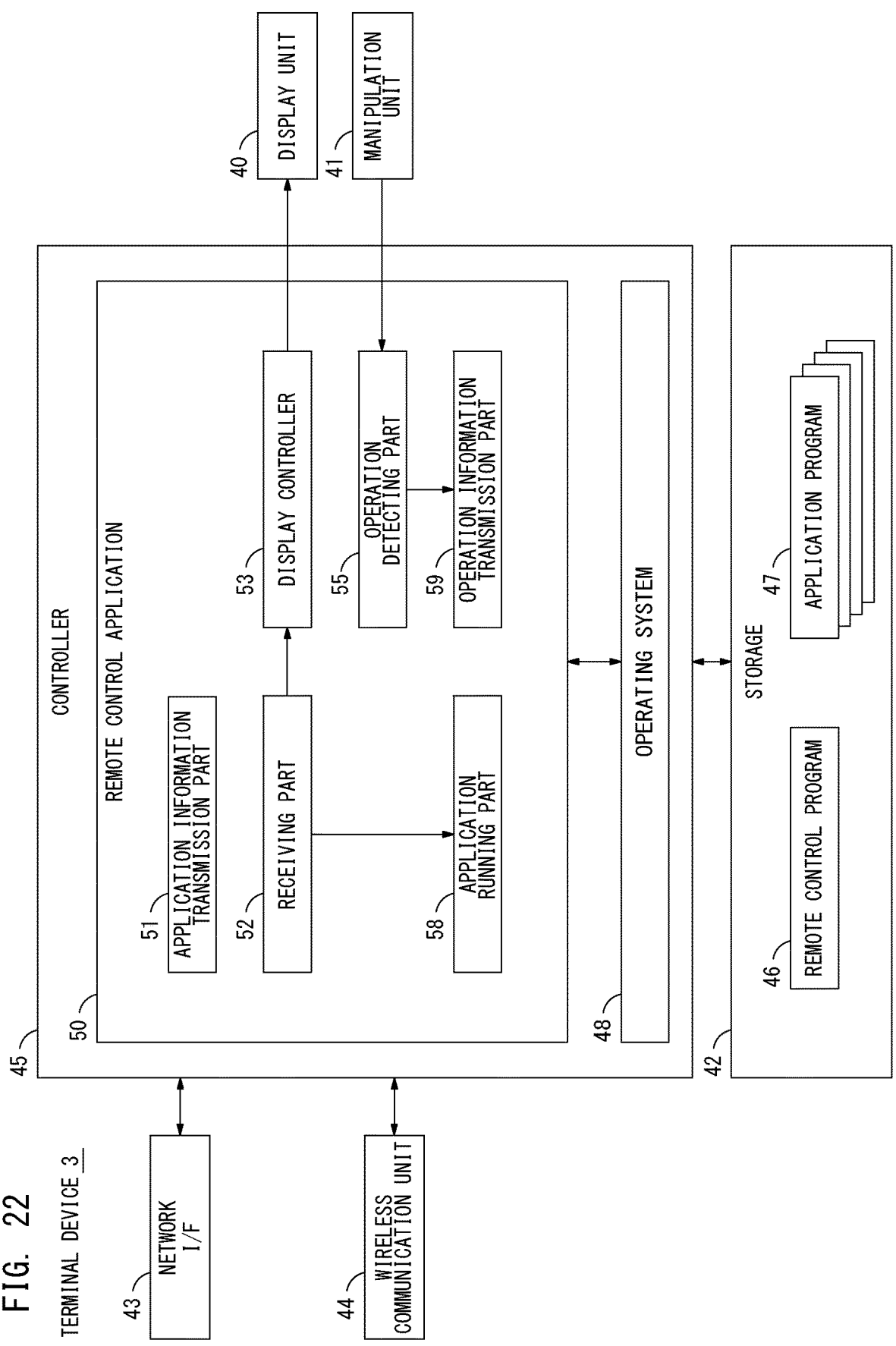
FIG. 22 is a block diagram showing an example of a hardware structure and that of a functional structure of a terminal device of the second preferred embodiment.

FIG. 22 is a block diagram showing an example of a hardware structure and that of a functional structure of the terminal device 3 of the second preferred embodiment. The terminal device 3 of the second preferred embodiment has the same hardware structure as that of the first preferred embodiment. The remote control application 50 run by the controller 45 includes the application information transmission part 51, the receiving part 52, the display controller 53, the operation detecting part 55, the operation information transmission part 59 and the application running part 58.

The application information transmission part 51 sends the application information relating to the application that may be run on the terminal device 3 to the image processing device 2 at the beginning of the communication with the image processing device 2. The receiving part 52 receives the screen and/or the application running information 25*b* from the image processing device 2. After receiving the screen, the receiving part 52 outputs the screen to the display controller 53, and enables the display controller 53 to display the screen on the display unit 40. When receiving the application running information 25*b* from the image processing device 2, the receiving part 52 outputs the application running information 25*b* to the application running part 58.

The application running part 58 runs the application via the operating system 48 based on the application running information 25*b* received from the receiving part 52. One application may be specified in the application running information 25*b*. In this case, the application running part 58 runs the specified application via the operating system 48. Multiple applications may be specified in the application running information 25*b*. In this case, the application running part 58 obtains the list of the multiple applications via the operating system 48, and selects and runs one of the applications from the list. The type of the applications may be specified in the application running information 25*b*. In this case, the application running part 58 obtains the list of the applications of the specified type via the operating system 48, and selects and runs one of the applications from the list. To be more specific, as the application running part 58 becomes operative at the terminal device 3, the terminal device 3 is allowed to execute one of the multiple application programs 47 stored in the storage 42 and runs the application, thereby performing the process depending on the user operation with the application.

The operation detecting part 55 detects the user operation via the manipulation unit 41. After the user operation is detected by the operation detecting part 55, the operation information transmission part 59 is brought into operation. The operation information transmission part 59 sends the operation information based on the user operation to the image processing device 2. To be more specific, every time the remote control application 50 detects the user operation, the operation information based on the detected user operation is sent to the image processing device 2.

Figure 23:
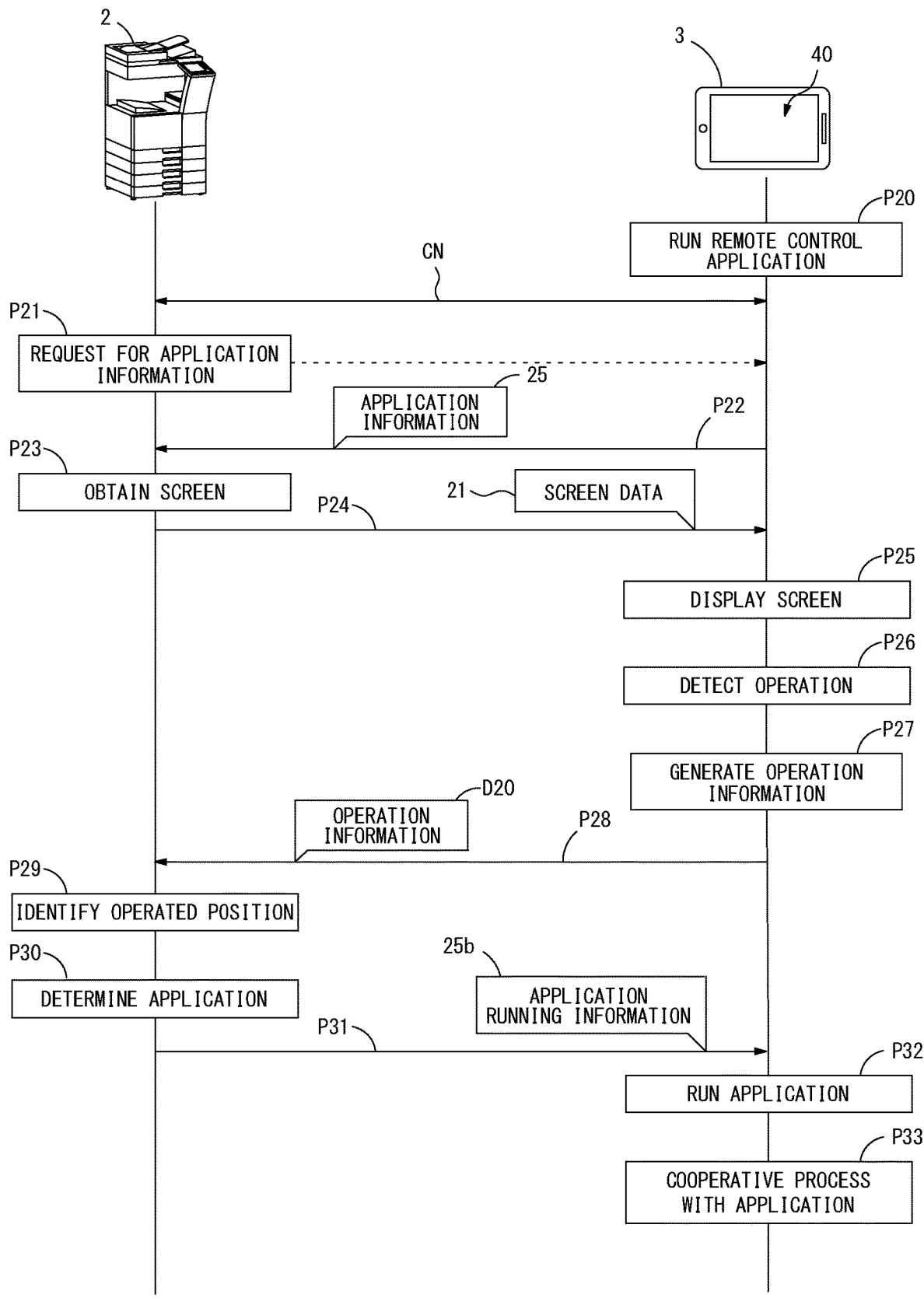
FIG. 23 shows an example of the operation process performed at the image processing device and the terminal device.

An operation process performed on the image processing system 1 of the second preferred embodiment is described next. FIG. 23 shows an example of the operation process performed at the image processing device 2 and the terminal device 3. The terminal device 3 executes the remote control program 46 in response to the user instruction at first, and runs the remote control application 50 (process P20). After running the remote control application 50, the terminal device 3 establishes the communication CN with the image processing device 2. When the communication CN with the terminal device 3 is established, the image processing device 2 brings the application information obtaining part 30 into operation to send the request for the application information 25 to the terminal device 3 (process P21). In response to receiving the request for the application information 25 from the image processing device 2, the terminal device 3 brings the application information transmission part 51 of the remote control application 50 into operation. The application information transmission part 51 obtains the application information 25 relating to the application program 47 installed on the terminal device 3 via the operating system 48, and sends the obtained application information 25 to the image processing device 2 (process P25). After obtaining the application information 25, the image processing device 2 brings the screen obtaining part 31 into operation. The screen obtaining part 31 reads the screen data 21 in the storage 15, and obtains the screen to display at the terminal device 3 (process P23). The screen transmission part 34 of the image processing device 2 becomes operative next. The screen transmission part 34 sends the screen data 21 obtained by the screen obtaining part 31 to the terminal device 3 (process P24).

After receiving the screen data 21 from the image processing device 2, the terminal device 3 brings the display controller 53 into operation. The display controller 53 displays the screen on the display unit 40 based on the screen data 21 (process P25). After the operation detecting part 55 detects the user operation (process P26), the terminal device 3 brings the operation information transmission part 59 into operation. The operation information transmission part 59 generates operation information D20 based on the user operation (process P27), and sends the generated operation information D20 to the image processing device 2 (process P28).

After receiving the operation information D20 from the terminal device 3, the image processing device 2 identifies the operated position touched by the user based on the operation information D20 (process P29). The image processing device 2 determines if the user operation is to run the application on the terminal device 3 (process P30). It is assumed that the user operation is to run the application on the terminal device 3. In this case, the image processing device 2 brings the application running controller 38 into operation. The application running controller 38 obtains the application running information 25*b* corresponding to the operated position touched by the user in the application information 25, and sends the application running information 25*b* to the terminal device 3 (process P31).

When receiving the application running information 25*b* from the image processing device 2 after sending the operation information D2, the terminal device 3 runs the application based on the application running information 25*b* (process P32). As the same as the first preferred embodiment, the application running part 58 may obtain the list of the applications corresponding to the application running information 25b from the operating system 48, and select and run one of the applications to run from the list. The remote control application 50 starts the cooperative process with another application run by the operating system 48 after the process P32 (process P33).

According to the second preferred embodiment, as the image processing device 2 and the terminal device 3 work in concert with each other as described above so that the application on the terminal device 3 may be run automatically. Moreover, the process corresponding to the user operation made at the terminal device 3 may be performed at the terminal device 3.

As described above, on the image processing system 1 of the second preferred embodiment, the image processing device 2 sends the screen to the terminal device 3 to enable the display of the screen at the terminal device 3. Also, when the operation information D20 is received from the terminal device 3, the image processing device 2 is configured to determine the application to run on the terminal device 3 based on the screen sent to the terminal device 3, and send the application running information 25b based on the determination result to the terminal device 3. The terminal device 3, on the other hand, is configured to display the screen received from the image processing device 2 on the display unit 40. When detecting the user operation, the terminal device 3 is configured to send the operation information D20 corresponding to the detected operation to the image processing device 2, and automatically run the application based on the application running information 25b received from the image processing device 2. As described above, in response to detecting the user operation as displaying the screen, the terminal device 3 sends the operation information D20 corresponding to the detected operation to the image processing device 2, thereby obtaining the application running information 25b and running the application. Also, the terminal device 3 is allowed to enable the application to perform the process corresponding to the user operation. Hence, it is not necessary for the image processing device 2 to perform all the process corresponding to the user operation, resulting in less process burden on the image processing device 2. As a result, improvement in the job execution efficiency at the image processing device 2 may be realized.

Everything else except for the points described above in the second preferred embodiment is the same as that explained in the first preferred embodiment.

(Modifications)

While the preferred embodiments of the present invention have been described above, the present invention is not limited to the preferred embodiments. Various modifications may be applied to the present invention.

According to the above-described first and second preferred embodiments, for sending the screen to the display unit 40 of the terminal device 3, the image processing device 2 sends the screen as the image data which is converted to the JPEG data or the bitmap data. However, this is given not for limitation. The data form of the screen sent to the terminal device 3 from the image processing device 2 is not necessarily the image data given above. It is assumed for example the remote control application 50 run on the terminal device 3 is included with the web browser function. In this case, the image processing device 2 may send the screen described in web page form such as HTML to the terminal device 3. The image processing device 2 is then allowed to embed the cooperative application information 28 in the web page with such as the HTML and send.

According to the above-described first and second preferred embodiments, for sending the screen including the preview area to the terminal device 3, the image processing device 2 sends the original image data 22 or the document data 23 together with the screen. However, this is given not for limitation. The terminal device 3 may request the image processing device 2 for the original data when detecting that the user operation is to give the instruction on image edit or the document edit, and the image processing device 2 may send the original data in response to the request from the terminal device 3.

According to the above-described first and second preferred embodiments, the image processing device 2 is shown to be the MFP provided with the multiple functions including the copy function, the scan function, the print function, the fax function and the box function. However, this is given not for limitation. To be more specific, the image processing device 2 may be a device that is provided with at least one of the multiple functions including the copy function, the scan function, the print function, the fax function and the box function and configures the settings about the job and/or executes the job in response to the user operation.

What is claimed is:

1. An image processing system comprising:
   a terminal device; and
   an image processing device which sends still image data, which is converted from screen data of a screen displayed on a display of said image processing device and used to operate said image processing device, to said terminal device in response to communication performed via a remote control between said image processing device and said terminal device, said still image data being generated in said image processing device and being updated based on an operated position touched by a user on a screen of a display of said terminal device,
   wherein:
   said image processing device comprises a first CPU which:
      analyzes a type of content displayed in each of respective different plural areas in said screen to determine application running information identifying an application corresponding to said type of content for each of said areas, said application being an application to be run on said terminal device from among a plurality of types of applications that are preinstalled on said terminal device prior to a beginning of a communication between said image processing device and said terminal device,
      generates cooperative application information, the cooperative application information associating each of the respective different plural areas in said screen with its corresponding application running information, and
      sends, to said terminal device, said cooperative application information attached to said still image data, and
   said terminal device comprises a second CPU which:
      identifies an operated position touched by a user on said screen when a user operation on said screen displayed on the display is detected;
      determines, by referring to said cooperative application information attached to said still image data when said operated position is identified, whether an area including said operated position is associated with application running information, and runs an application, from among the plurality of types of applications that are preinstalled on said terminal device, that corresponds to said type of content identified by said application running information associated with the area including said operated position in response to a determination that said area including said operated position is associated with application running information.

2. The image processing system according to claim 1, wherein:
said first CPU further obtains application information relating to the plurality of types of applications that are preinstalled on said terminal device from said terminal device at the beginning of the communication between said image processing device and said terminal device, and
said first CPU determines said application running information based on said application information.

3. The image processing system according to claim 1, wherein when multiple types of applications are associated with the area including said operated position in said application running information, said second CPU controls the display to display a list of the multiple applications and runs an application selected from the displayed multiple applications.

4. The image processing system according to claim 1, wherein when multiple types of applications are associated with the area including said operated position in said application running information, said second CPU selects and runs the application, from among the multiple types of applications, that is set in advance.

5. The image processing system according to claim 1, wherein when only one application is associated with the area including said operated position in said application running information, said second CPU runs the only one application.

6. The image processing system according claim 1, wherein said terminal device further includes:
a display controller that splits the screen on said display and displays a display screen displayed by the application and said screen at the same time when the application is run by said second CPU.

7. The image processing system according to claim 1, wherein said terminal device further includes:
a display controller that displays a display screen displayed by the application on the front of said display and said screen on the back of said display when the application is run by said second CPU.

8. The image processing system according to claim 1, wherein said terminal device stores a first application which is executable to receive said screen data from said image processing device, to thereby display said screen that is usable to operate said image processing device, and
wherein said terminal device runs the application, which is one of the plurality of types of applications that are preinstalled on said terminal device and is a different application from said first application, in response to the operation input to the screen displayed thereon.

9. The image processing system according to claim 1, wherein the image processing device obtains said screen data from a storage of the image processing device.

10. The image processing system according to claim 1, wherein the first CPU determines the application running information for each of said areas based on whether the content displayed in the area is one of an image and text.

11. An image processing device which sends still image data, which is converted from screen data of a screen displayed on a display of said image processing device and used to operate said image processing device, to a terminal device in response to communication performed via a remote control between said image processing device and said terminal device, said still image data being generated in said image processing device and being updated based on an operated position touched by a user on a screen of a display of said terminal device, and the image processing device comprising a hardware processor configured to:
analyze a type of content displayed in each of respective different plural areas in said screen to determine application running information identifying an application corresponding to said type of content for each of said areas, said application being an application to be run on said terminal device from among a plurality of types of applications that are preinstalled on said terminal device prior to a beginning of a communication between said image processing device and said terminal device;
generate cooperative application information, the cooperative application information associating each of the respective different plural areas in said screen with its corresponding application running information; and
send, to said terminal device, said cooperative application information attached to said still image data.

12. The image processing device according to claim 11, wherein the hardware processor further:
obtains application information relating to the plurality of types of applications that are preinstalled on said terminal device from said terminal device at the beginning of the communication between said image processing device and said terminal device, and
determines said application running information based on said application information.

13. The image processing system according to claim 11, wherein the first CPU determines the application running information for each of said areas based on whether the content displayed in the area is one of an image and text.

14. A terminal device which communicates with an image processing device and operates said image processing device via a remote control, the terminal device comprising:
a display;
a storage in which a plurality of types of applications that are preinstalled on said terminal device prior to a beginning of a communication between said image processing device and said terminal device are stored; and
a hardware processor configured to:
receive, from said image processing device, (i) still image data converted from screen data of a screen displayed on a display of said image processing device and used to operate said image processing device and (ii) cooperative application information attached to said still image data;
display, on the display, said screen corresponding to said still image data, said screen being usable to operate said image processing device;
detect a user operation on said screen displayed on the display;
identify an operated position touched by a user on said screen when the user operation is detected;
determine, by referring to said cooperative application information attached to said still image data when said operated position is identified, whether an area including said operated position is associated with application running information, said application running information being included in the cooperative application information and identifying, for each of respective different plural areas in said screen, an application corresponding to a type of content displayed in said area to be run on said terminal device, from among the plurality of types of applications; and run an application, from among the plurality of types of applications that are preinstalled on said terminal device, that corresponds to said type of content identified by said application running information associated with the area including said operated position in response to determining that said area including said operated position is associated with application running information.

15. The terminal device according to claim 14, wherein, when multiple types of applications are associated with the area including said operated position in said application running information, said hardware processor controls the display to display a list of the multiple applications on said display and runs an application selected from the displayed multiple applications.

16. The terminal device according to claim 14, wherein, when multiple types of applications are associated with the area including said operated position in said application running information, said hardware processor selects and runs the application, from among the multiple types of applications, that is set in advance.

17. The terminal device according to claim 14, wherein when only one application is associated with the area including said operated position in said application running information, said hardware processor runs the only one application.

18. The terminal device according to claim 14, further comprising:
a display controller that splits the screen on said display and displays a display screen displayed by the application and said screen at the same time when the application is run by said hardware processor.

19. The terminal device according to claim 14, further comprising:
a display controller that displays a display screen displayed by the application on the front of said display and said screen on the back of said display when the application is run by said hardware processor.

20. A non-transitory computer readable recording medium storing a program which, when executed by a processor of an image processing device, causes the processor to perform operations comprising:
sending still image data, which is converted from screen data of a screen displayed on a display of said image processing device and used to operate said image processing device, to a terminal device in response to communication performed via a remote control between said image processing device and said terminal device, said still image data being generated in said image processing device and being updated based on an operated position touched by a user on a screen of a display of said terminal device;
analyzing a type of content displayed in each of respective different plural areas in said screen to determine application running information identifying an application corresponding to said type of content for each of said areas, said application being an application to be run on said terminal device from among a plurality of types of applications that are preinstalled on said terminal device prior to a beginning of a communication between said image processing device and said terminal device;
generating cooperative application information, the cooperative application information associating each of the respective different plural areas in said screen with its corresponding application running information; and
sending, to said terminal device, said still image data together with said cooperative application information attached to said still image data.

21. The image processing system according to claim 20, wherein the first CPU determines the application running information for each of said areas based on whether the content displayed in the area is one of an image and text.

22. A non-transitory computer readable recording medium storing a program which, when executed by a processor of a terminal device comprising a display, causes the processor to perform operations of:
receiving, from an image processing device, (i) still image data converted from screen data of a screen displayed on a display of said image processing device and used to operate said image processing device and (ii) cooperative application information attached to said still image data;
displaying, on the display, said screen corresponding to said still image data, said screen being usable to operate said image processing device;
detecting a user operation on said screen displayed on the display;
identifying an operated position touched by a user on said screen when the user operation is detected;
determining, by referring to said cooperative application information attached to said still image data when said operated position is identified, whether an area including said operated position is associated with application running information, said application running information being included in the cooperative application information and identifying, for each of respective different plural areas in said screen, an application corresponding to a type of content displayed in said area to be run on said terminal device, from among a plurality of types of applications that are preinstalled on said terminal device prior to a beginning of a communication between said image processing device and said terminal device; and
running an application, from among the plurality of types of applications that are preinstalled on said terminal device, that corresponds to said type of content identified by said application running information associated with the area including said operated position in response to determining that said area including said operated position is associated with application running information.

* * * * *